United States Patent
Kriese et al.

(10) Patent No.: US 9,233,599 B2
(45) Date of Patent: Jan. 12, 2016

(54) DOOR MODULE WITH AN AGGREGATE CARRIER WITH GUIDE SECTIONS FORMED THEREON

(75) Inventors: Olaf Kriese, Coburg (DE); Markus Schultz, Nuremberg (DE); Yasuo Ohyama, Nagoya (JP); Werner Stammberger, Grub am Forst (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 256 days.

(21) Appl. No.: 12/831,088

(22) Filed: Jul. 6, 2010

(65) Prior Publication Data

US 2012/0007386 A1   Jan. 12, 2012

(51) Int. Cl.
*B60J 5/04* (2006.01)

(52) U.S. Cl.
CPC .................... *B60J 5/0416* (2013.01)

(58) Field of Classification Search
CPC ......... B60J 5/0413; B60J 5/0416; E05D 1/00; E05D 3/00; E05D 5/00; E05D 5/0207; E05D 11/0027
USPC .................... 49/348, 349, 352, 351, 374, 502
See application file for complete search history.

(56) References Cited

U.S. PATENT DOCUMENTS

| | | | |
|---|---|---|---|
| 4,716,681 A * | 1/1988 | Ugawa ............................. | 49/349 |
| 5,251,403 A | 10/1993 | Compeau et al. | |
| 5,535,553 A | 7/1996 | Staser et al. | |
| 5,673,515 A * | 10/1997 | Weber et al. .................... | 49/352 |
| 6,170,199 B1 | 1/2001 | Stenzel et al. | |
| 6,301,835 B1 * | 10/2001 | Pfeiffer et al. .................. | 49/502 |
| 6,302,472 B1 | 10/2001 | Rahmstorf et al. | |
| 6,536,164 B1 * | 3/2003 | Kirejczyk ........................ | 49/502 |
| 6,688,043 B1 * | 2/2004 | Feder et al. ..................... | 49/352 |
| 6,874,279 B1 * | 4/2005 | Weber et al. .................... | 49/352 |
| 7,347,026 B1 | 3/2008 | Garcia Martin et al. | |
| 2001/0037607 A1 * | 11/2001 | Pfeiffer et al. .................. | 49/502 |
| 2002/0162208 A1 * | 11/2002 | Wurm et al. .................... | 29/430 |
| 2004/0012226 A1 | 1/2004 | Morrison et al. | |

(Continued)

FOREIGN PATENT DOCUMENTS

| | | |
|---|---|---|
| DE | 198 01 842 A1 | 7/1999 |
| DE | 199 44 965 A1 | 3/2001 |

(Continued)

OTHER PUBLICATIONS

English translation of Notification of Reason(s) for Rejection for Application No. JP 2010-153653, dated Feb. 25, 2014, 2 pages.

*Primary Examiner* — Gregory J Strimbu
*Assistant Examiner* — Marcus Menezes
(74) *Attorney, Agent, or Firm* — Christie, Parker & Hale, LLP

(57) ABSTRACT

A door module for a vehicle door comprises an aggregate carrier for holding functional components of the vehicle door and at least one guide section arranged on the aggregate carrier for guiding an adjustment part along an adjustment direction on the aggregate carrier. The at least one guide section is formed at least sectionally flexible and movable perpendicularly to the adjustment direction relative to a rigid section of the aggregate carrier. In this way a door module with an aggregate carrier is provided which can be produced in an easy and cost efficient manner and can be used substantially without structural modifications in different conditions.

13 Claims, 20 Drawing Sheets

(56) References Cited

U.S. PATENT DOCUMENTS

| | | |
|---|---|---|
| 2004/0128917 A1* | 7/2004 | Lin et al. ............ 49/502 |
| 2004/0163320 A1* | 8/2004 | Kirejczyk .............. 49/352 |
| 2006/0064938 A1* | 3/2006 | Unterreiner et al. ......... 49/502 |
| 2006/0196122 A1 | 9/2006 | Urieta et al. |
| 2007/0199246 A1* | 8/2007 | Renke et al. ........... 49/352 |
| 2009/0019775 A1 | 1/2009 | Kruger et al. |
| 2010/0084887 A1 | 4/2010 | Krüger et al. |

FOREIGN PATENT DOCUMENTS

| | | |
|---|---|---|
| DE | 10 2004 011 250 B3 | 12/2005 |
| DE | 10 2004 063 510 A1 | 7/2006 |
| DE | 20 2007 003 905 U1 | 8/2008 |
| DE | 10 2007 013 549 A1 | 9/2008 |
| DE | 10 2008 000 477 A1 | 9/2009 |
| DE | 10 2008 056 806 A1 | 5/2010 |
| DE | 10 2008 058 906 A1 | 5/2010 |
| DE | 102008058906 A1 * | 5/2010 |
| DE | 10 2008 054 895 A1 | 7/2010 |
| JP | 59-148870 | 10/1984 |
| JP | 06-081537 | 3/1994 |
| JP | 2002-527289 A | 8/2002 |
| JP | 2004-132089 | 4/2004 |

* cited by examiner

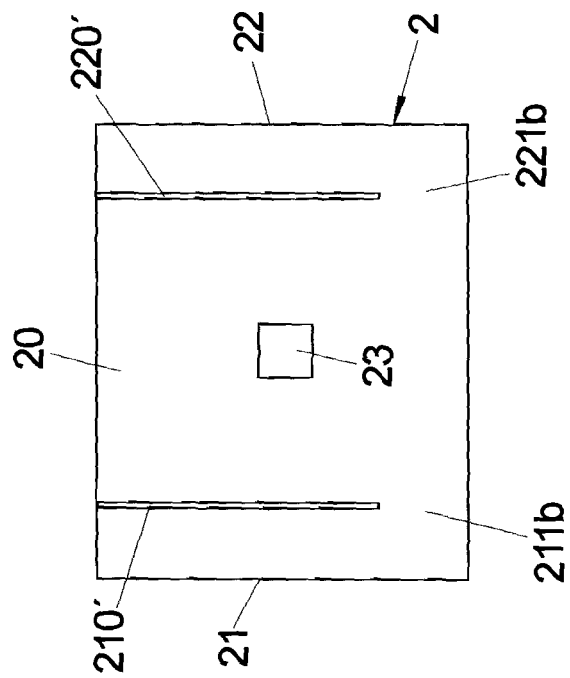
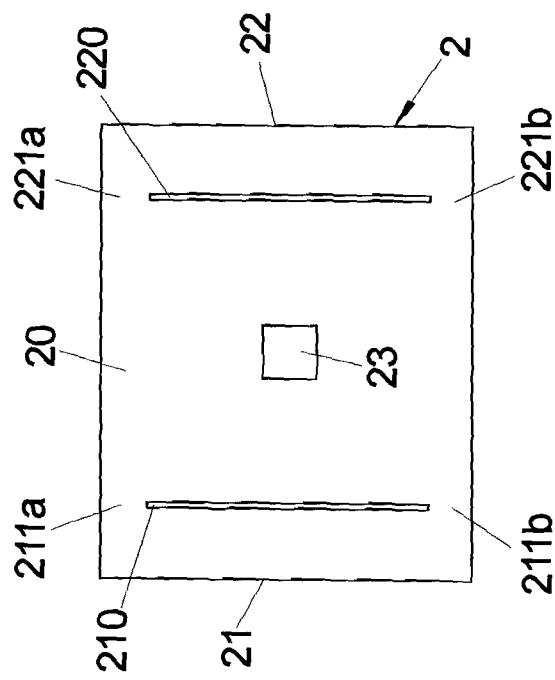

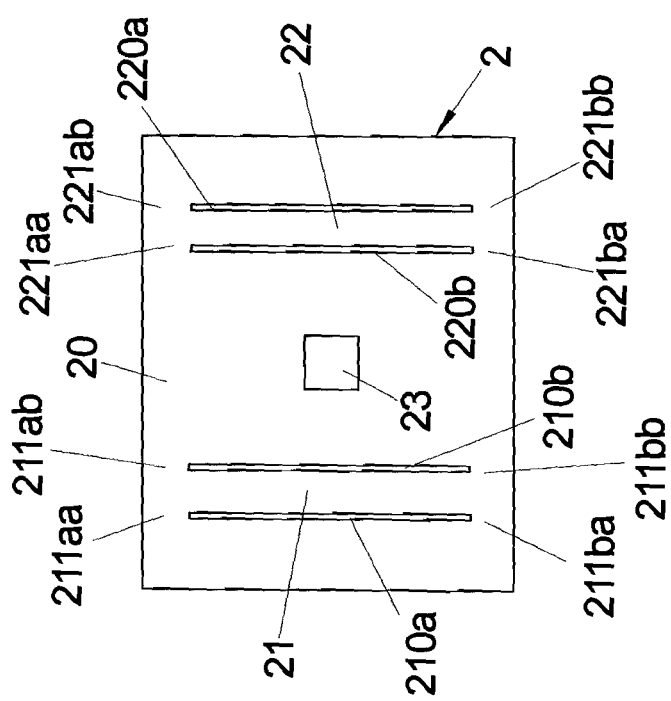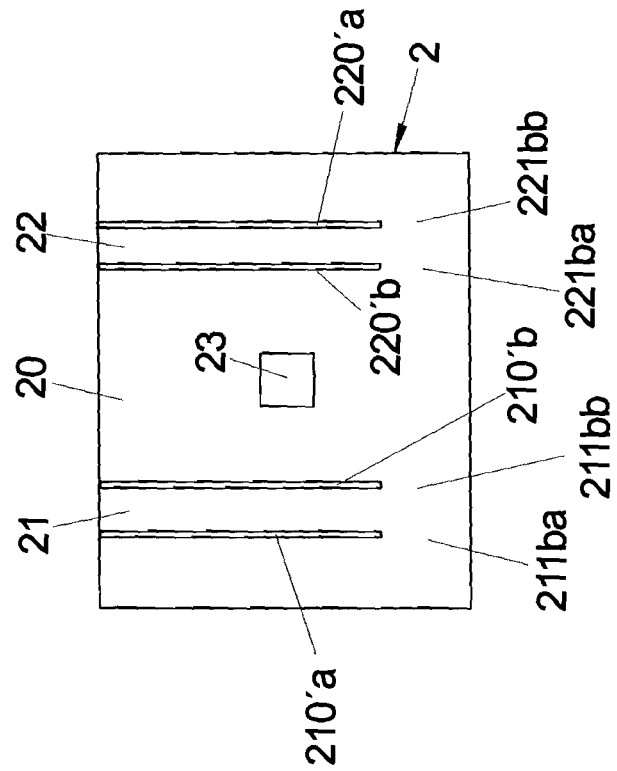

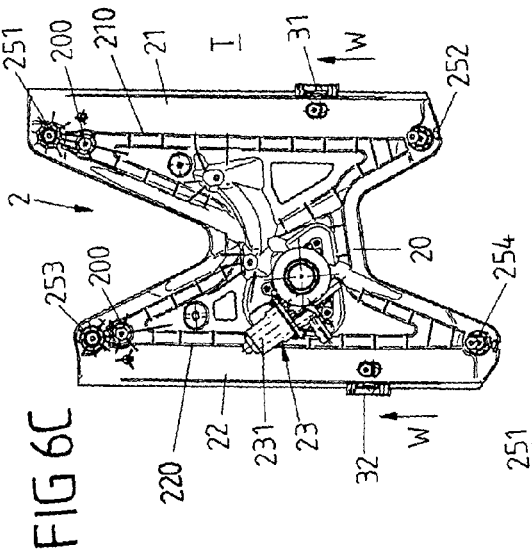
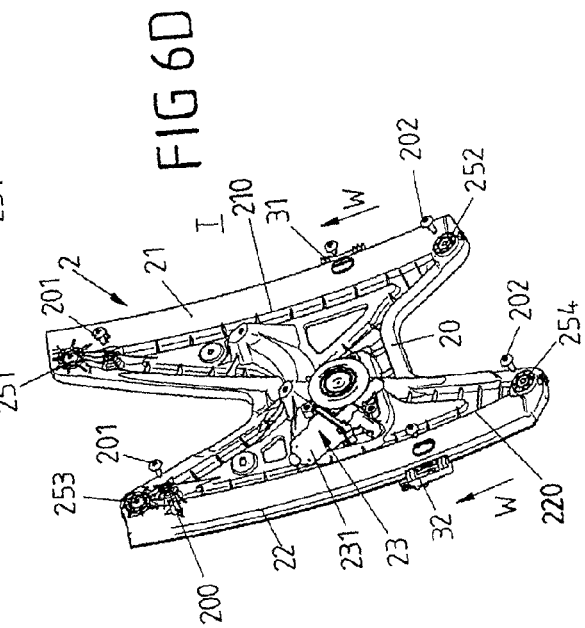
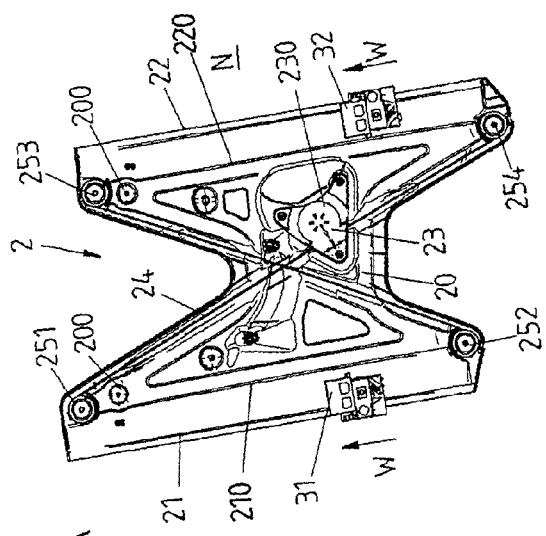
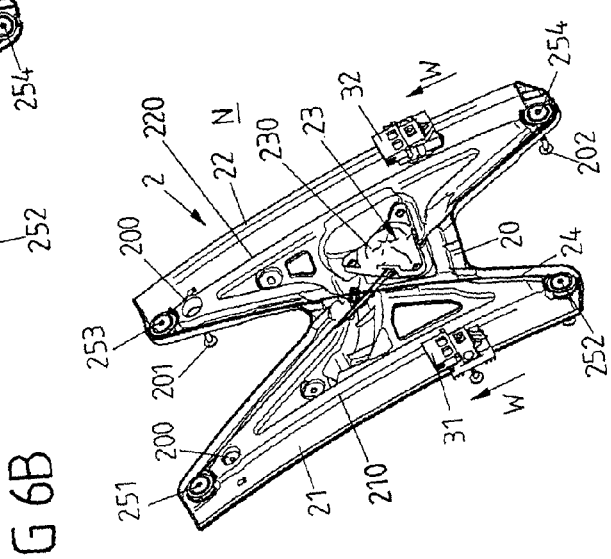

FIG 7A
FIG 7B
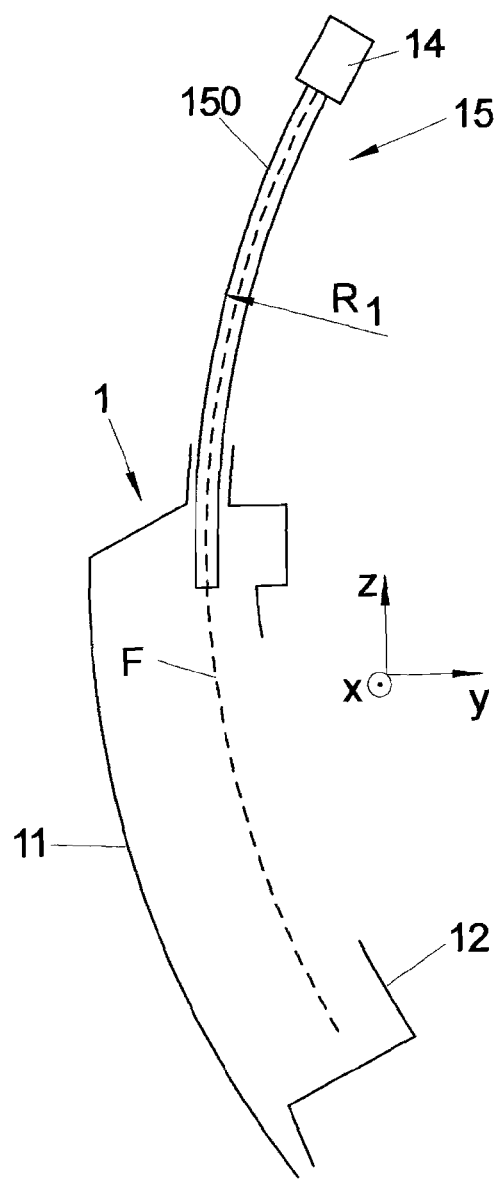
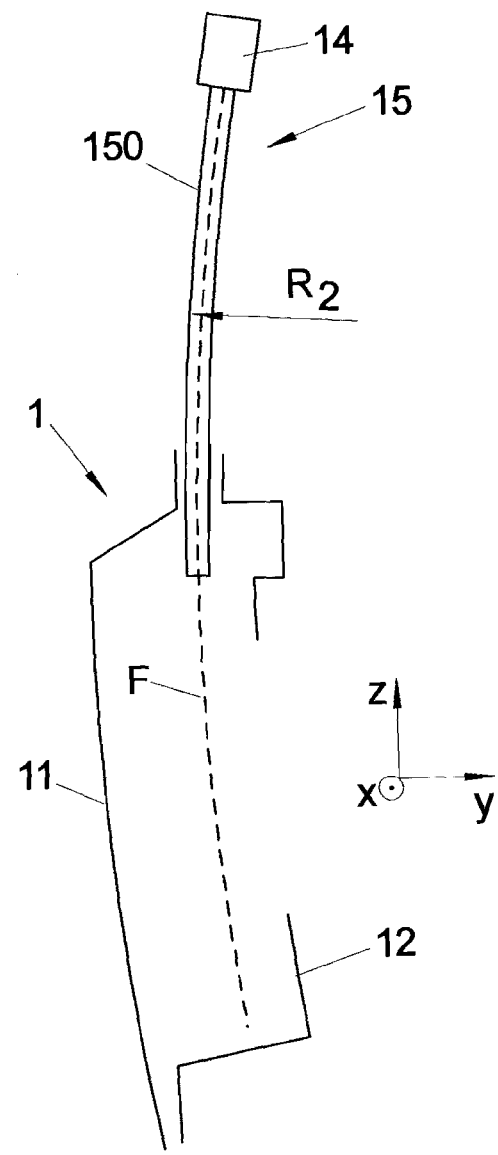

FIG 8A
FIG 8B
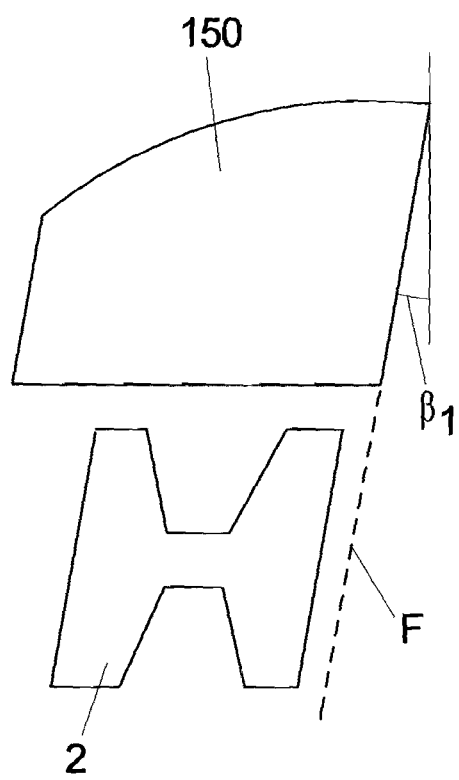
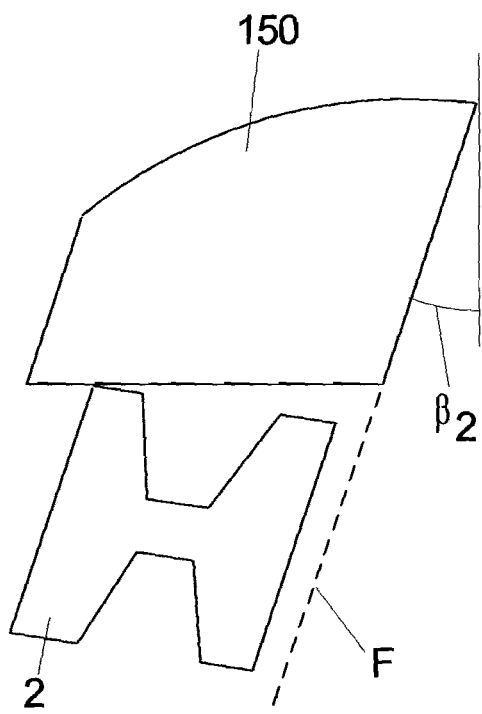

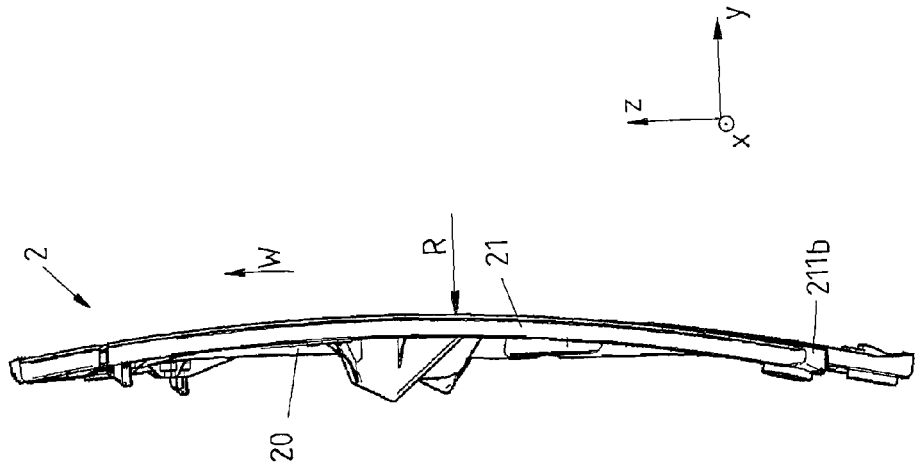
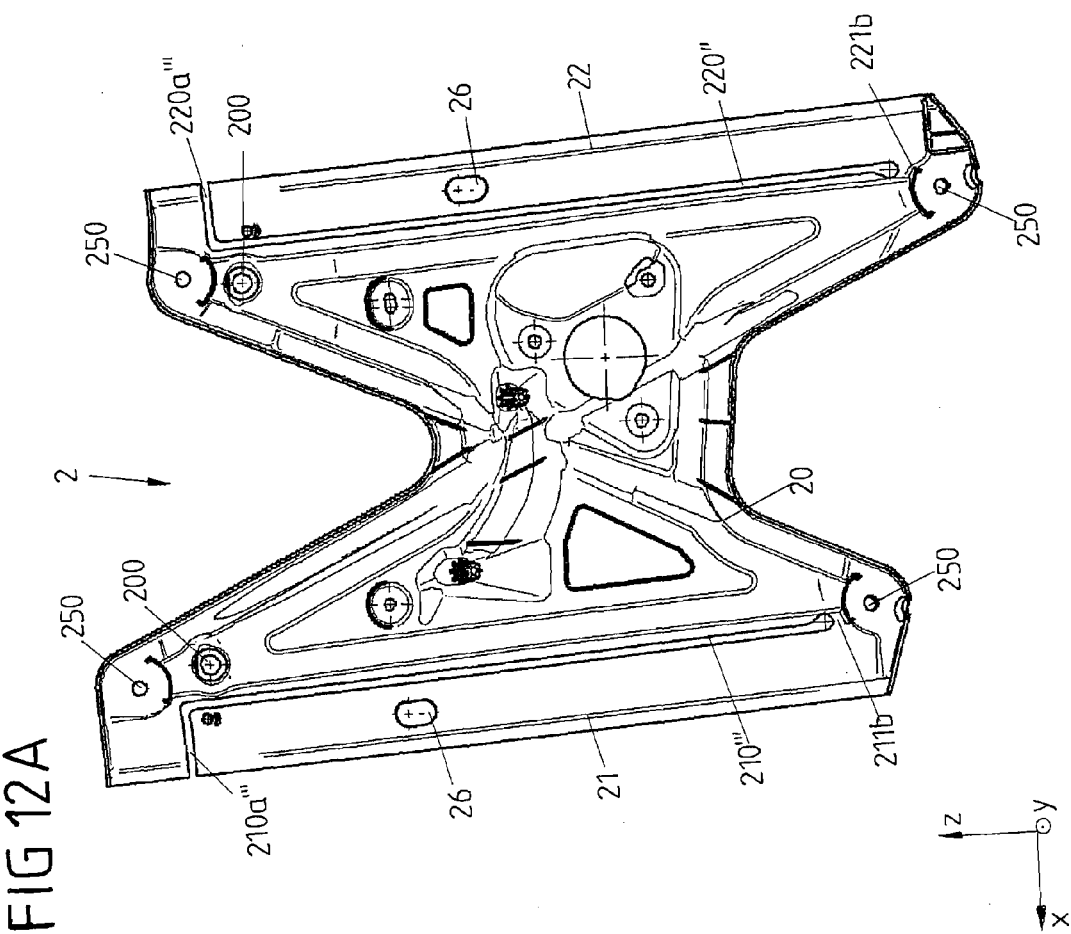

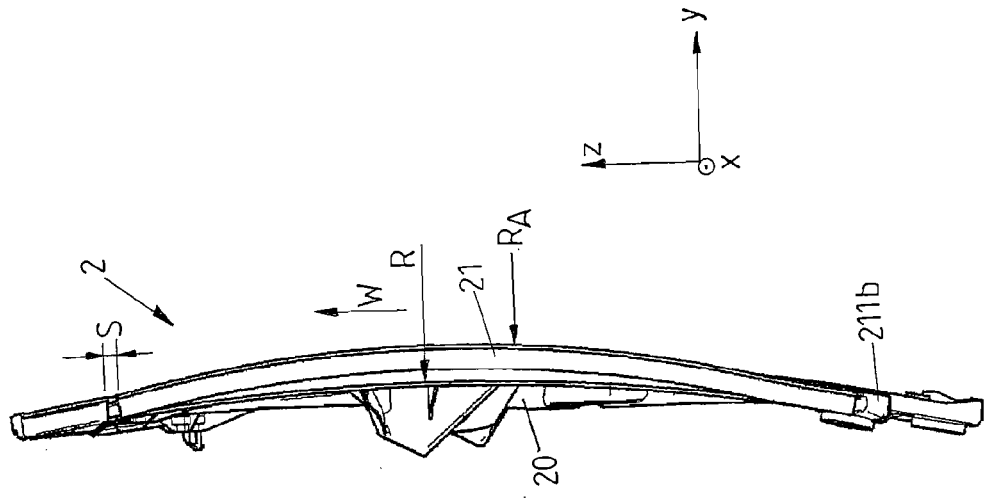
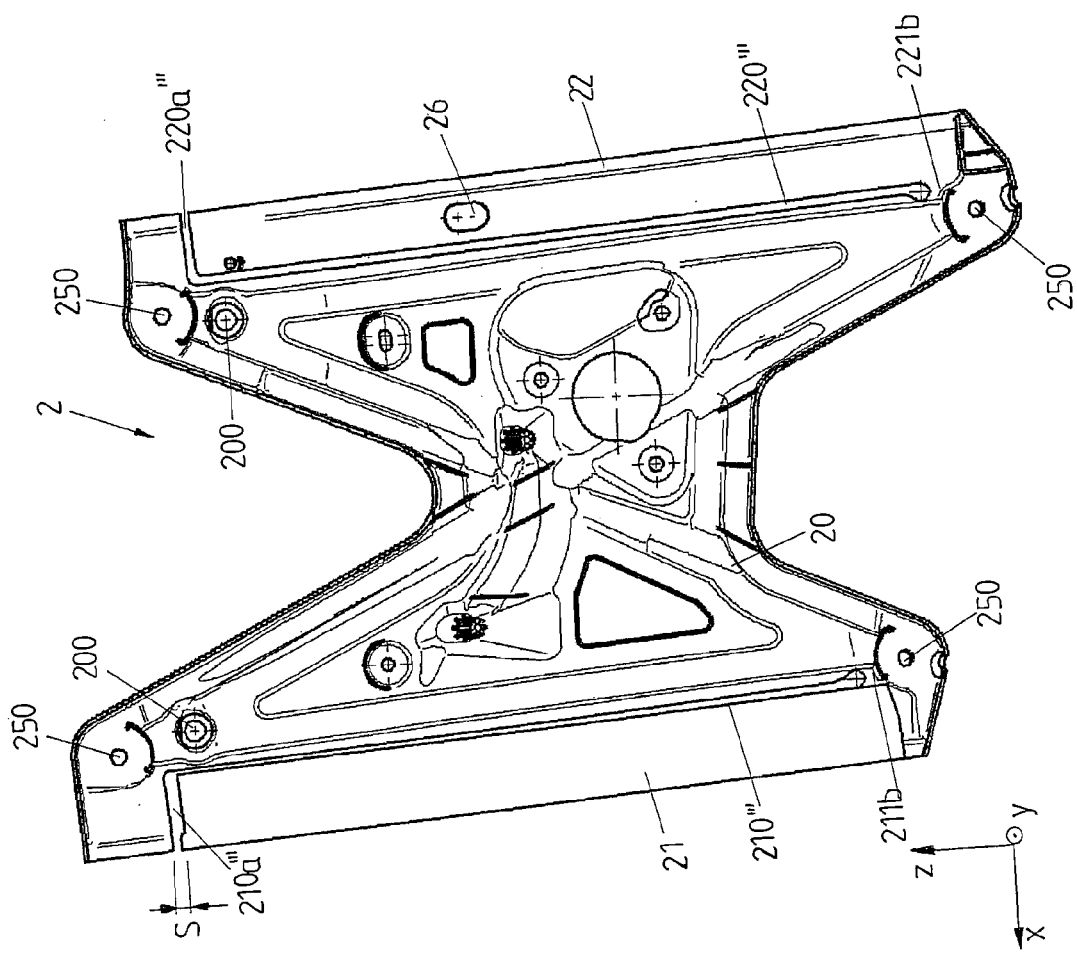

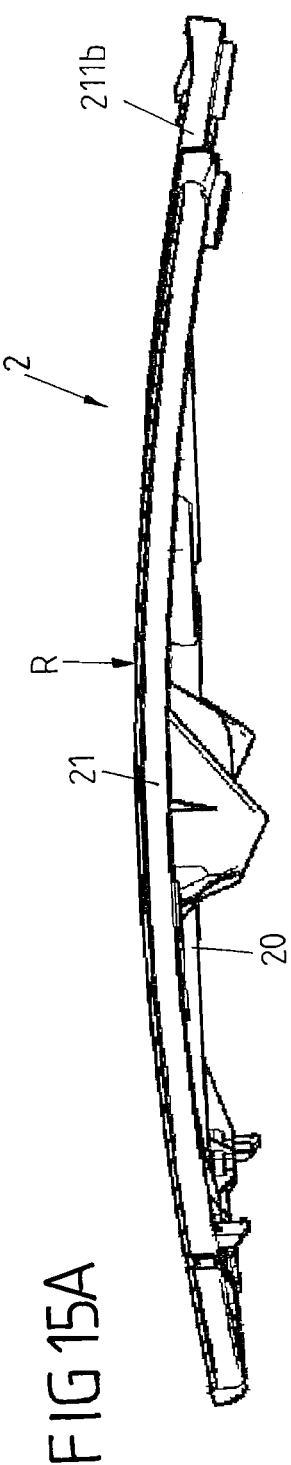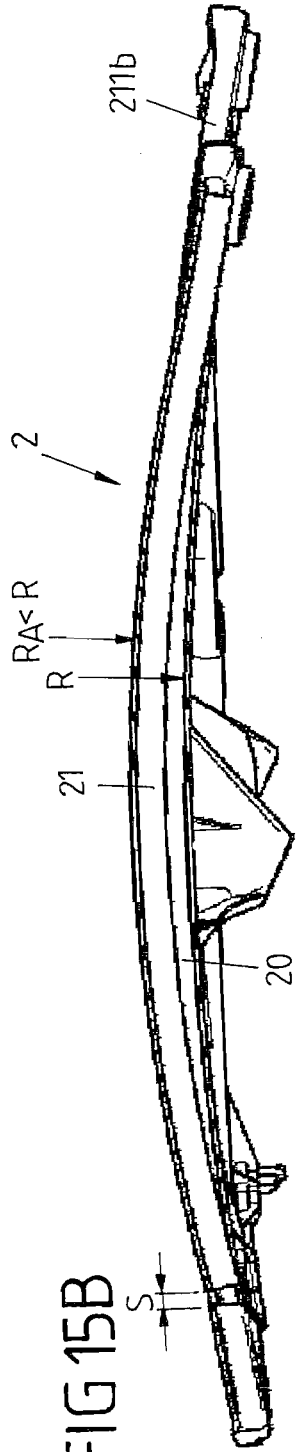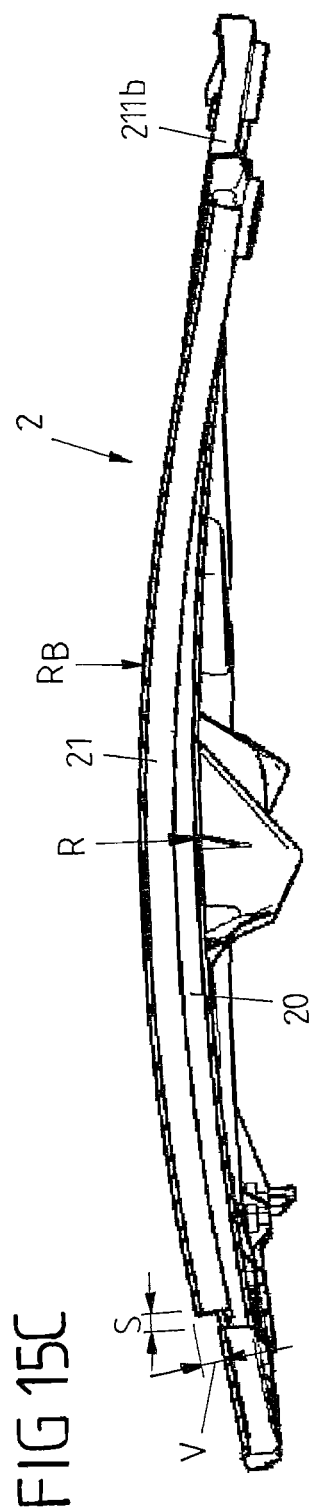

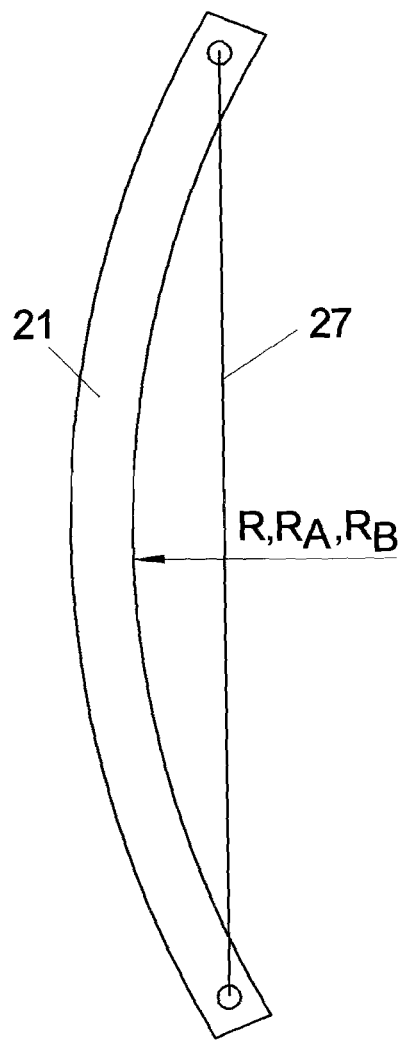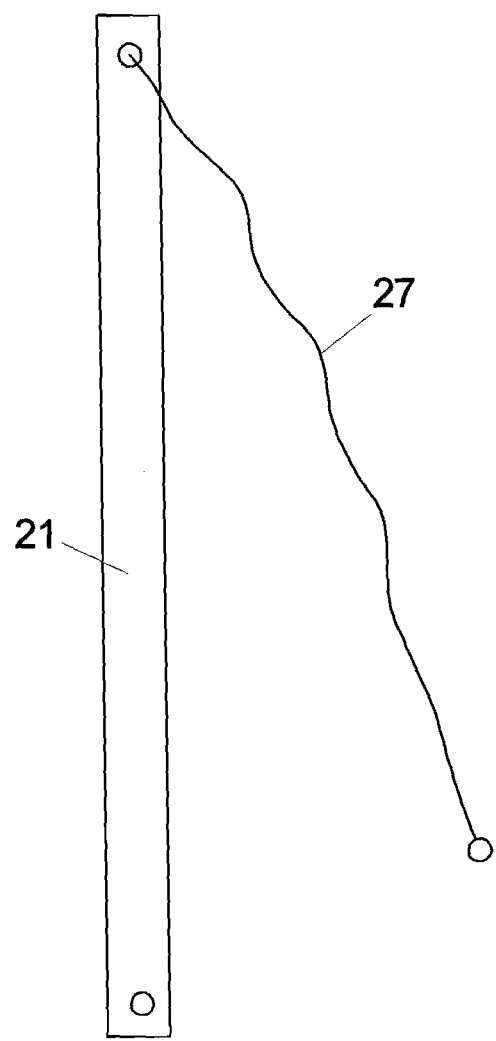

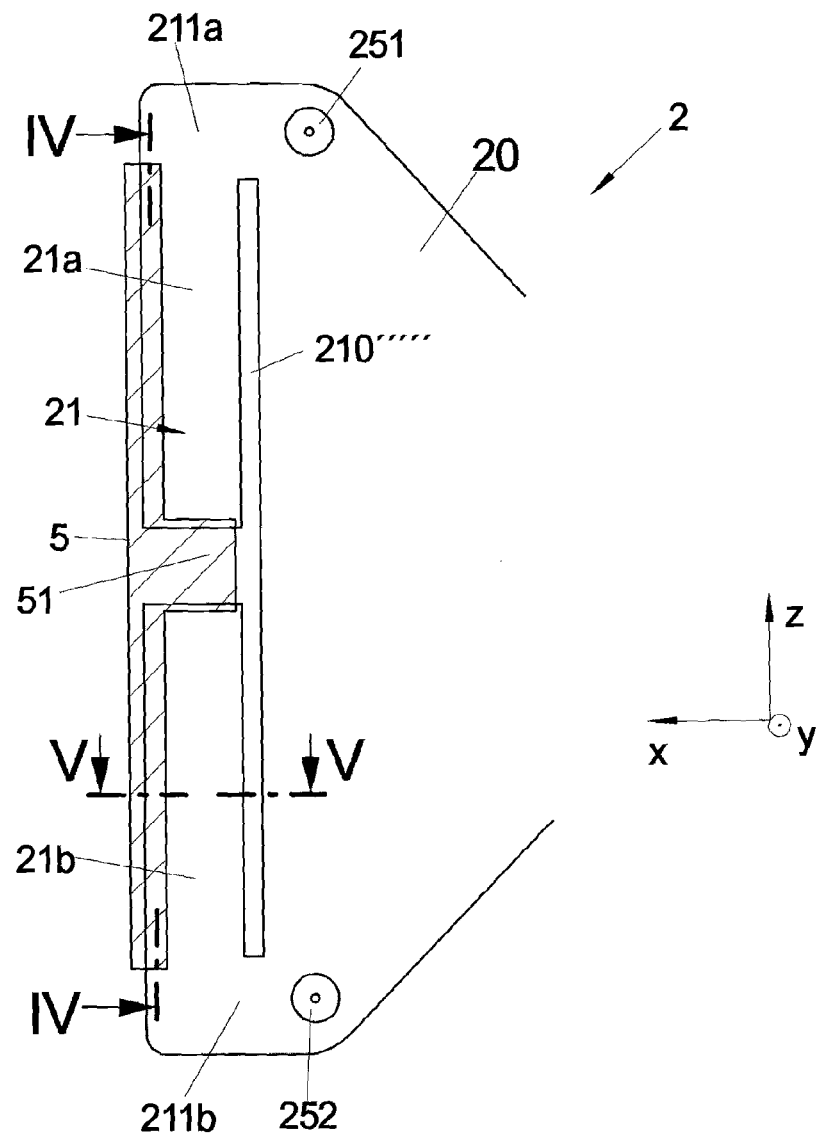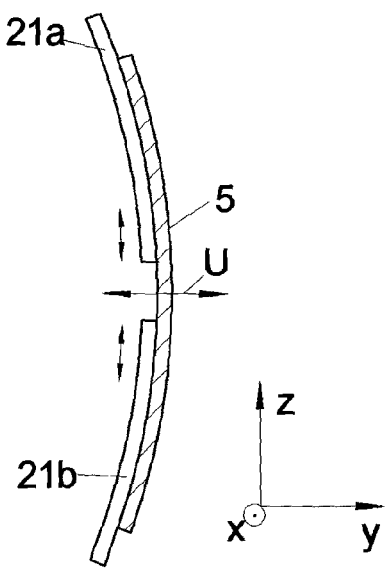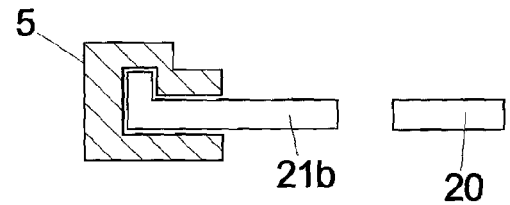

DOOR MODULE WITH AN AGGREGATE CARRIER WITH GUIDE SECTIONS FORMED THEREON

BACKGROUND

The invention relates to a door module for a vehicle door according to the preamble of claim 1.

A door module of this kind comprises an aggregate carrier for holding functional components of the vehicle door and at least one guide section arranged on the aggregate carrier for guiding an adjustment part along an adjustment direction on the aggregate carrier.

Conventional door modules use an aggregate carrier on which functional components, for example a window lift unit, a loudspeaker, a side airbag, a door lock assembly or the like are arranged to provide a pre-mounted, pre-testable unit which in an easy way can be mounted on a vehicle door. As part of a window lift unit the aggregate carrier herein carries one or more guide sections in the shape of guide rails, along which a window pane—in this case constituting the adjustment part—is guided and via which the window pane is movably connected with the aggregate carrier.

From DE 199 44 965 B4 a door module of a vehicle door is known, comprising an aggregate carrier in the shape of a plastic carrier plate to which a guide section in the shape of a guide rail is integrally molded. On the plastic carrier plate a drive unit is arranged, which is operative to move a window pane of the vehicle door being connected via a carrier with the guide rail.

Door modules of the described kind are used in different shapes for different vehicles. Each vehicle type and each variant of a vehicle type herein requires, generally, a specific, individual shape of the door module, in particular of the aggregate carrier, because the vehicle doors of the different variants and the different vehicle types are built differently and differ in their constructive design and their configuration. For example, for different vehicle doors window panes with different radii of curvature and different pitch angles (which indicate whether a window pane is moved into a vehicle door almost perpendicularly or in an oblique direction) are used and require a specific adaption of the aggregate carrier in particular with respect to the guide sections arranged on the aggregate carrier, because the provided guide sections must be adapted, in their radii of curvature and their angular arrangement on the aggregate carrier, to the window pane to be adjusted.

SUMMARY

It is an object of the instant invention to provide a door module with an aggregate carrier which can be produced in an easy and low cost manner and is usable without substantial structural changes under different conditions.

Herein it is provided that the at least one guide section at least sectionally is formed flexible and movable perpendicularly to the adjustment direction relative to a rigid section of the aggregate carrier.

The invention starts out from the idea to divide an aggregate carrier functionally into at least one guide section and a rigid section. Along the guide section the adjustment part to be adjusted, for example a window pane, is guided, wherein through the flexible built of the guide section and the movable connection of the guide section to the rigid section of the aggregate carrier a flexibility within the aggregate carrier is provided, by means of which the guide section can be flexibly adapted to the adjustment part to be adjusted. In that the guide section is made flexible in at least one section and is connected movably in at least one section with the rigid section, the guide section can adapt to the adjustment part and in particular can be fitted to the radius of curvature of the adjustment part to be adapted to.

With the instant door module a door module is provided which can be used in a universal manner in different variants of a vehicle type and for different vehicle types. The adaption of the door module to the different conditions herein takes place in that the at least one guide section is made flexible with respect to the rigid section of the aggregate carrier and, thus, can be flexibly adapted to the adjustment part to be adjusted, in particular a window pane, when connecting the aggregate carrier to a vehicle door.

Preferably, the at least one guide section is arranged on the rigid section of the aggregate carrier such that the guide section, with at least one section, can be moved in one direction substantially perpendicular to an extension plane of the aggregate carrier relative to the rigid section of the aggregate carrier and/or can be pivoted with respect to the rigid section. This can be achieved for a guide section which is formed integrally with the rigid section of the aggregate carrier for example in that the at least one guide section is sectionally cut free from the rigid section of the aggregate carrier via at least one recess opening.

By means of the recess opening for cutting free the guide section it is achieved that the guide section in such regions in which it is cut free from the rigid section of the aggregate carrier can move relative to the rigid section. Through the recess opening in particular a movability of the guide section perpendicular to the flatly extending, rigid section of the aggregate carrier is provided such that the guide section can be adapted flexibly to the movement path of the adjustment part defined by the shape and the radius of curvature of the adjustment part.

The at least one recess opening provided between the guide section and the rigid section is for example formed in the shape of a slot and divides the guide section sectionally from the rigid section. In regions in which the guide section is not cut free from the rigid section the guide section is connected to the rigid section of the aggregate carrier by means of one or more connecting sections, wherein also the connecting sections can be formed flexibly.

The at least one guide section extends, preferably, on the aggregate carrier along a longitudinal direction corresponding substantially to the vertical direction of a vehicle. The at least one guide section herein can be connected via an upper and/or a lower connecting section with the rigid section of the aggregate carrier and can sectionally be cut free from the rigid section of the aggregate carrier by means of the at least one recess opening.

In a first variant the guide section is connected with the rigid section by means of an upper and a lower connecting section and is cut free from the rigid section by means of a central recess opening, such that a guide section results which is connected on its upper and its lower end with the rigid section, however is movable relative to the rigid section in its central region through provision of the recess opening. The maximum flexibility to the rigid section is obtained approximately in the center of the guide section.

In a second variant the at least one guide section is connected to the rigid section of the aggregate carrier on a first end by means of a connecting section, however, is cut free from the rigid section of the aggregate carrier on a second end opposite to the first end. A guide section is obtained which is connected to the rigid section of the aggregate carrier only on one of its ends, however, is cut free along its longitudinal direction and on its upper end and, hence, is flexible relative to the rigid section of the aggregate carrier. In that the guide section is not connected with the rigid section on its second end, the maximum flexibility of the guide section is obtained in the region of the cut-free second end.

In an embodiment corresponding to the second variant the guide section is cut free in the region of the upper end such that a maximum flexibility is obtained in the upper region of the guide section. This is advantageous because an adjustment part being formed as a window pane is, once it is guided in the upper region of the guide section, guided conventionally sideways on a door frame and sealings arranged thereon and, hence, is held within the door frame. If in contrast the window pane is guided in the lower region close to the end of the guide section which is not cut free, the window pane is in a region of the guide section which is less flexible and thereby is securely held on the guide section and on the aggregate carrier.

In a third variant it is provided that the at least one guide section is cut free from the rigid section of the aggregate carrier by means of multiple recess openings for producing a sectionally flexible connection of the at least on guide section with the rigid section. Thus, multiple recess openings formed separately from each other are provided which can comprise different lengths. Through providing the different recess openings the moment of inertia of the connection of the guide rail with the rigid section can be distinctly adapted and can be varied along the longitudinal direction of the guide section. According to the varying moment of inertia a flexible connection of the guide section to the rigid section results whose flexibility varies and can be adapted, in a transitional region between an end of the guide section fixedly connected to the rigid section and a cut free end, in a distinct manner to a movement path of the adjustment part to be adjusted.

Through the at least sectionally movable, flexible connection of the guide section to the rigid section of the aggregate carrier it becomes possible to use a universal door module in a variable fashion in different vehicles and vehicle types by adjusting the radius of curvature of the guide section to an adjustment part to be adjusted. The radius of curvature of the guide section herein can be in particular smaller, possibly however also larger than the radius of curvature of the rigid section of the aggregate carrier, wherein the aggregate carrier can be produced and delivered with a correspondingly preshaped guide section. It also, however, is possible to produce the aggregate carrier in one piece for example from plastics or metal with a uniform curvature and uniform radius of curvature and to adjust it subsequently to the conditions of a specific adjustment part.

For adapting the guide section to a specific adjustment part a separate adapter piece can be provided which is arranged between the guide section and the rigid section in the region of the recess opening. The adapter piece can herein—for example in that the adapter piece compresses the guide section relative to the rigid section—define the radius of curvature of the guide section or can define an offset of the guide section perpendicular to the rigid section of the aggregate carrier. The adapter piece can for example be made of plastics and can be inserted into a recess opening such that by compressing and bending the guide section the radius of curvature and/or the offset of the guide section are set in a desired manner.

It also is possible to define the radius of curvature and the offset of the guide section relative to the rigid section of the aggregate carrier by fixing the aggregate carrier to a door inner panel of the vehicle door. The door inner panel, with fixing points arranged thereon, is formed herein such that it defines the radius of curvature and an offset relative to the rigid section of the aggregate carrier, for example in that the guide section is compressed during fixing on the door inner panel and, thus, is adapted in its radius of curvature relative to the rigid section of the aggregate carrier.

To adjust the radius of curvature of the guide section along its longitudinal direction, in addition or alternatively tensioning means can be provided which are arranged between the ends of the guide section such that they tension the at least sectionally flexible guide section in a desired manner and thereby bend the guide section.

To ensure a sliding guidance of the adjustment part along the guide section—for example by using a carrier for connecting the adjustment part with the guide section—a profile part can be provided which is for example formed as an extruded plastic part and is arranged in a sticking manner on the guide section. Through using the profile part recess openings can be bridged such that the adjustment part can be guided along the guide section across recess openings.

In an advantageous embodiment the aggregate carrier comprises two guide sections, along each of which a carrier for guidance of the adjustment part is guided. The carriers serve for connecting the adjustment part to the guide sections and can be for example formed as slidingly guided plastic parts. By using two guide sections a two-path cable window lifter can be provided in which the adjustment part in the shape of a window pane is guided along the guide sections in a desired manner.

BRIEF DESCRIPTION OF THE DRAWINGS

The idea underlying the invention shall subsequently be explained in more detail according to the embodiments shown in the figures. Herein FIG. 1 shows a schematic view of an aggregate carrier with sectionally cut free guide sections formed on outer edges of the aggregate carrier;

FIG. 2 shows a schematic view of another variant of an aggregate carrier with sectionally cut free guide sections formed on outer edges of the aggregate carrier;

FIG. 3 shows a schematic view of another variant of an aggregate carrier with sectionally cut free guide sections formed within the aggregate carrier;

FIG. 4 shows a schematic view of another variant of an aggregate carrier with sectionally cut free guide sections formed within the aggregate carrier;

FIG. 6A-6D show separate views of an aggregate carrier with guide sections arranged thereon;

FIG. 7A, 7B show schematic views of two window panes with different radius of curvature on a vehicle door;

FIG. 8A, 8B show schematic views of two window panes with different pitch angles;

FIG. 12A, 12B show views of another variant of an aggregate carrier with sectionally cut free guide sections;

FIG. 13A, 13B show views of a modified embodiment of the variant according to FIG. 12A, 12B with a guide section having a smaller radius of curvature;

FIG. 15A-15C show comparative side views of the embodiments according to FIGS. 12 to 14;

FIG. 20A, 20B show views of a tensioning means on a guide section for adjusting the radius of curvature;

FIG. 22A-22C show views of an aggregate carrier with a cut free guide section which is interrupted in the centre and bridged by means of a profile part.

DETAILED DESCRIPTION

Figure 5:
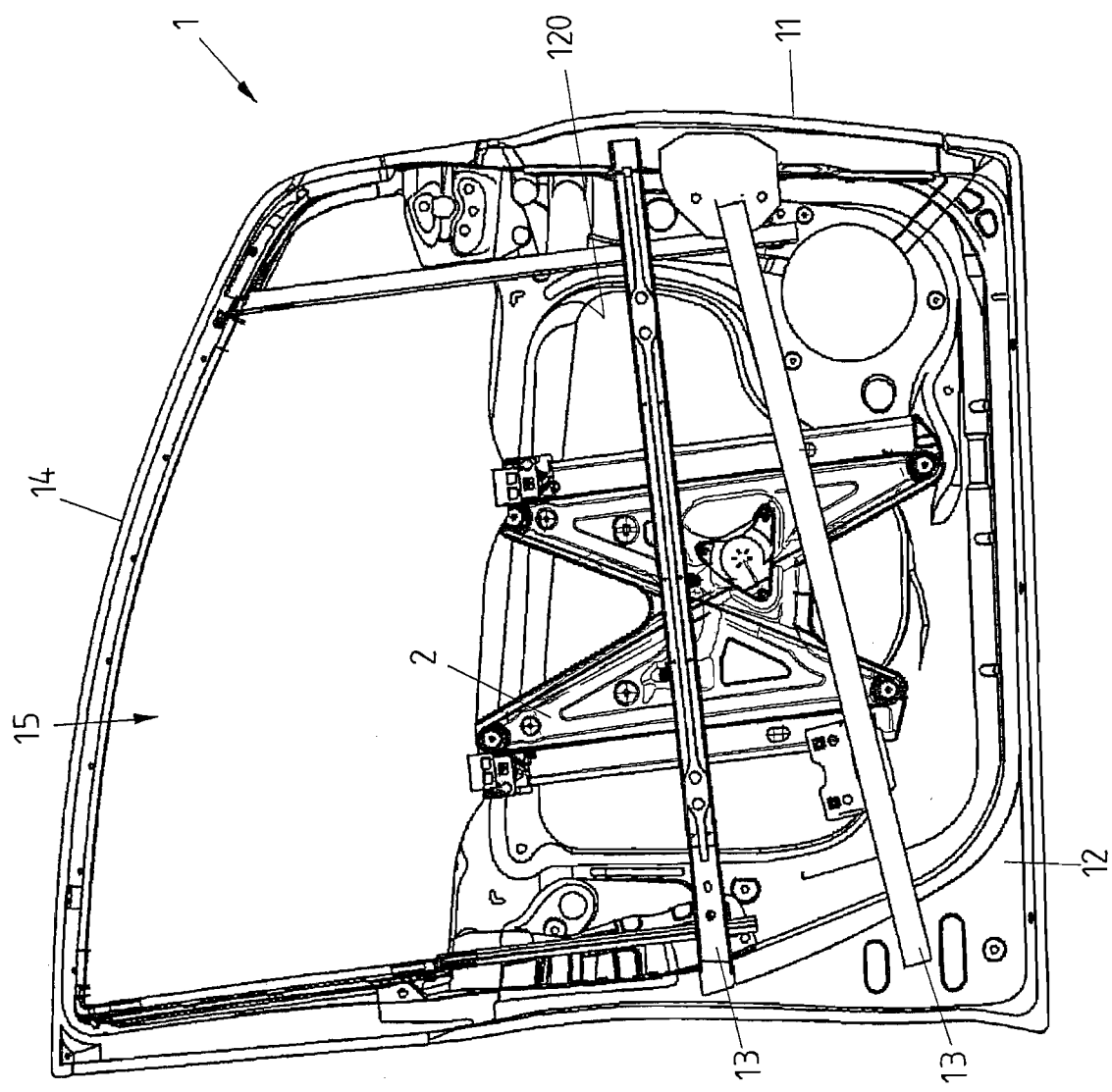
FIG. 5 shows a view of a vehicle door with an aggregate carrier arranged thereon.

FIG. 5 shows a vehicle door 1 comprising a door outer panel 11 and a door inner panel 12 which is to be mounted as a front side door on a vehicle. The vehicle door comprises an upper door frame 14 which surrounds a window opening 15 and extends from a door body formed by the door outer panel 11 and the door inner panel 12. Towards the outside of the vehicle door 1 crash barriers 13 are arranged which shall receive and absorb crash forces occurring at a side impact onto the vehicle door 1.

At an opening 120 of the door inner panel 12 an aggregate carrier 2 is arranged which serves for receiving functional components of the vehicle door 1, in particular a window lifter unit, a door lock assembly, a side airbag or the like, and which can be produced from metal or, alternatively, from plastics.

Separate views of the aggregate carrier 2 are shown in FIG. 6A-6D. The aggregate carrier 2, in the shown embodiment, carries components of a window lifter, namely a drive unit 23, deflections 251-254, carriers 31, 32 and guide sections 21, 22 serving as guide rails and being formed in one piece on and integrally with the aggregate carrier 2. The window lifter serves for adjusting an adjustment part in the shape of a window pane to close the window opening 15 and is designed as a two-path cable window lifter. The drive unit 23 comprises a cable drum 230 which is arranged on a side of the aggregate carrier 2 (compare FIGS. 6A and 6B) pointing towards a wet space N of the vehicle door 1 and is driven by a motoric drive 231 (FIGS. 6C and 6D) arranged in a dry space T of the vehicle door 1.

The drive unit 23 is connected, via a traction means 24, to the carriers 31, 32 and via the carriers 31, 32 with the window pane. The traction means 24 extends from the cable drum 230 of the drive unit 23 to an upper deflection 251 in the region of the guide section 21, from there to a lower deflection 252, further to the upper deflection 253 in the region of the guide section 22 and via the lower deflection 254 back to the drive unit 23 such that a closed cable loop results. In operation of the window lifter the motoric drive 231 drives the cable drum 230 to perform a rotational movement, as the result of which one end of the traction means 24 is wound onto the cable drum 230 and another end of the traction means 24 is wound of the cable drum 230, such that the traction means 24 is displaced and an adjustment force is transferred to the carriers 31, 32 via the traction means 24. Through moving the traction means 24 the carriers 31, 32 and via the carriers 31, 32 the window pane is moved along an adjustment direction W.

The aggregate carrier 2 can be connected via fixing points 200 in its upper region and via the deflections 252, 254, which at the same time constitute fixing points, in its lower region to the door inner panel 12. For this, fixing bolts 201, 202 are provided which are inserted through the fixing points 200 respectively through the fixing points on the deflections 252, 254 and are brought into engagement with the door inner panel 12.

Dependent on different vehicle variants and different vehicle types a window pane may be designed in different shapes. As is shown in FIGS. 7A and 7B a window pane 150 may, for example in dependence on the shape of a vehicle door 1, comprise a specific radius of curvature R1, R2 which may be different for different vehicle doors 1. The radius of curvature R1, R2 of the window pane 150 defines a movement path F along which the window pane 150 for adjusting is driven into respectively out of a door inner space formed by the door outer panel 11 and the door inner panel 12.

As is schematically shown in FIGS. 8A and 8B different window panes 150 in addition can comprise different pitch angles $\beta 1$, $\beta 2$ which define the direction of the movement path F and determine whether a window pane 150 is for example driven into a vehicle door 1 in an almost vertical direction or in an oblique direction.

In dependence of the radius of curvature R1, R2 defined by a window pane 150 and the pitch angel $\beta 1$, $\beta 2$, also the guide sections 21, 22 of the aggregate carrier 2 must be designed in that the guide sections 21, 22 are adapted in their radius of curvature and their angular alignment to the radius of curvature R1, R2 and the pitch angle $\beta 1$, $\beta 2$ of the window pane 150 to be guided.

To provide an aggregate carrier 2 with guide sections 21, 22 arranged thereon which can be universally used for different vehicle variants and vehicle types without in a costly manner having to be adapted individually, within the context of the present invention it is provided to form the guide sections 21, 22 at least sectionally flexible and movable perpendicularly to the adjustment direction W relative to a rigid section 20 of the aggregate carrier 2.

Figure 9:
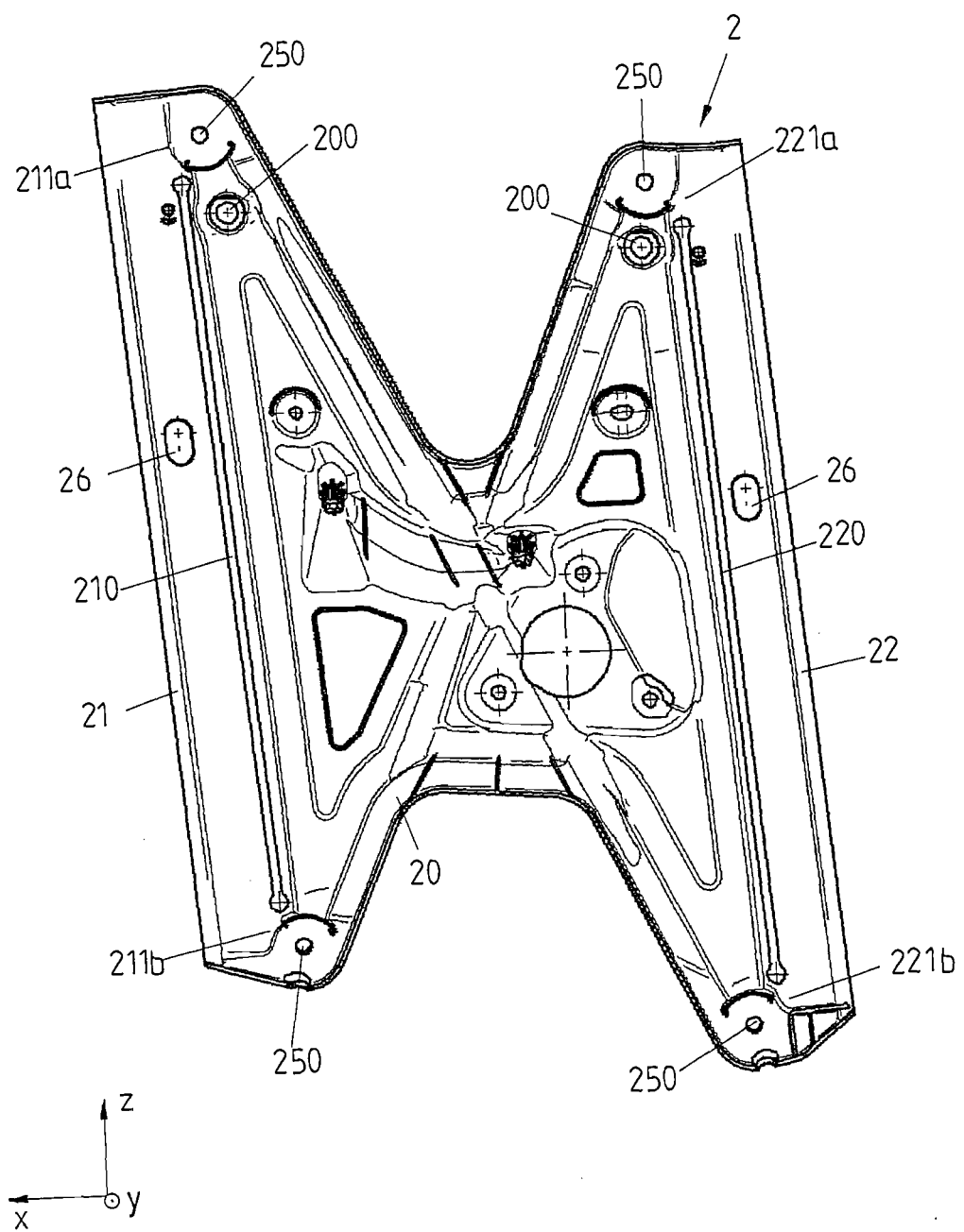
FIG. 9 shows a separate view of an aggregate carrier with sectionally cut free guide sections.

A first variant of an aggregate carrier 2 implementing the invention is shown schematically in FIG. 1 and in a specific embodiment in FIG. 9. The aggregate carrier 2 comprises two guide sections 21, 22 which extend substantially perpendicular sideways on the aggregate carrier 2 and, as is described previously, serve for guiding two carriers 31, 32 for adjusting a window pane 150. To provide a flexible connection of the guide sections 21, 22 the guide sections 21, 22 each are connected in lower connecting sections 211b, 221b and upper connecting sections 211a, 221a with a rigid section 20 of the aggregate carrier 2, however, are cut free recess openings 210, 220 in the shape of slots from the rigid section 20 of the aggregate carrier 2 and, hence, are movable in their cut free regions with respect to the rigid section 20 of the aggregate carrier 2.

The aggregate carrier 2 may have any shape, for example an almost rectangular shape as indicated in FIG. 1 or a shape specifically adapted to for example arrange a window lifter on the carrier plate 2, as indicated in FIG. 9. Also, the aggregate carrier 2 may serve to hold only a window lifter or, in addition, other functional components of the vehicle door.

The aggregate carrier 2 is shown in FIG. 9 without components arranged thereon. Fixing points 250 are provided to arrange the deflections 251-254 on the aggregate carrier 2. Via fixing points 200 and the lower fixing points 250 the aggregate carrier 2 can be connected with a door inner panel 12.

In the guide sections 21, 22 assembly openings 26 are provided through which one can reach through for fixing the window pane 150 to the carriers 31, 32.

The aggregate carrier 2 can be made of plastics or metal, for example a steel panel, wherein the guide sections 21, 22 are formed in one piece on the aggregate carrier 2 with the rigid section 20.

In that the guide sections 21, 22 are sectionally cut free from the rigid section 20 of the aggregate carrier 2, a flexibility of the guide sections 21, 22 in particular in the Y-direction, corresponding to the vehicle transverse direction, is provided. Because of the upper and lower connection via the connecting sections 211a, 211b respectively 221a, 221b the flexibility of the guide sections 21, 22 is maximum in their center regions such that in particular in the centre of the guide sections 21, 22 the guide sections 21, 22 can move perpendicular to the rigid section 20 of the aggregate carrier 2 by a comparatively large distance. Through the flexibility of the guide sections 21, 22 it is achieved that the guide sections 21, 22 can adjust to the movement path F of a window pane 150 to be adjusted and can flexibly give way to the window pane 150.

The length of the recess openings 210, 220 may be chosen differently. In particular, it is possible and possibly advantageous to have the recess openings 210, 220 extend not as far downwards and, hence, to shorten them such that the lower connecting sections 211b, 221b are widened and the guide sections 21, 22 are stiffened in their lower region. It is also possible to form the recess openings 210, 220 for the guide sections 21, 22 on the two sides to have different lengths to provide guide sections 21, 22 with differing flexibility.

By arranging the aggregate carrier 2 on a door inner panel 12 in a fashion adapted to the pitch angle β1, β2 of a window pane 150, even different pitch angles β1, β2 can be compensated, wherein the alignment of the guide sections 21, 22 is defined according to movement direction determined by the pitch angle β1, β2.

Figure 10:
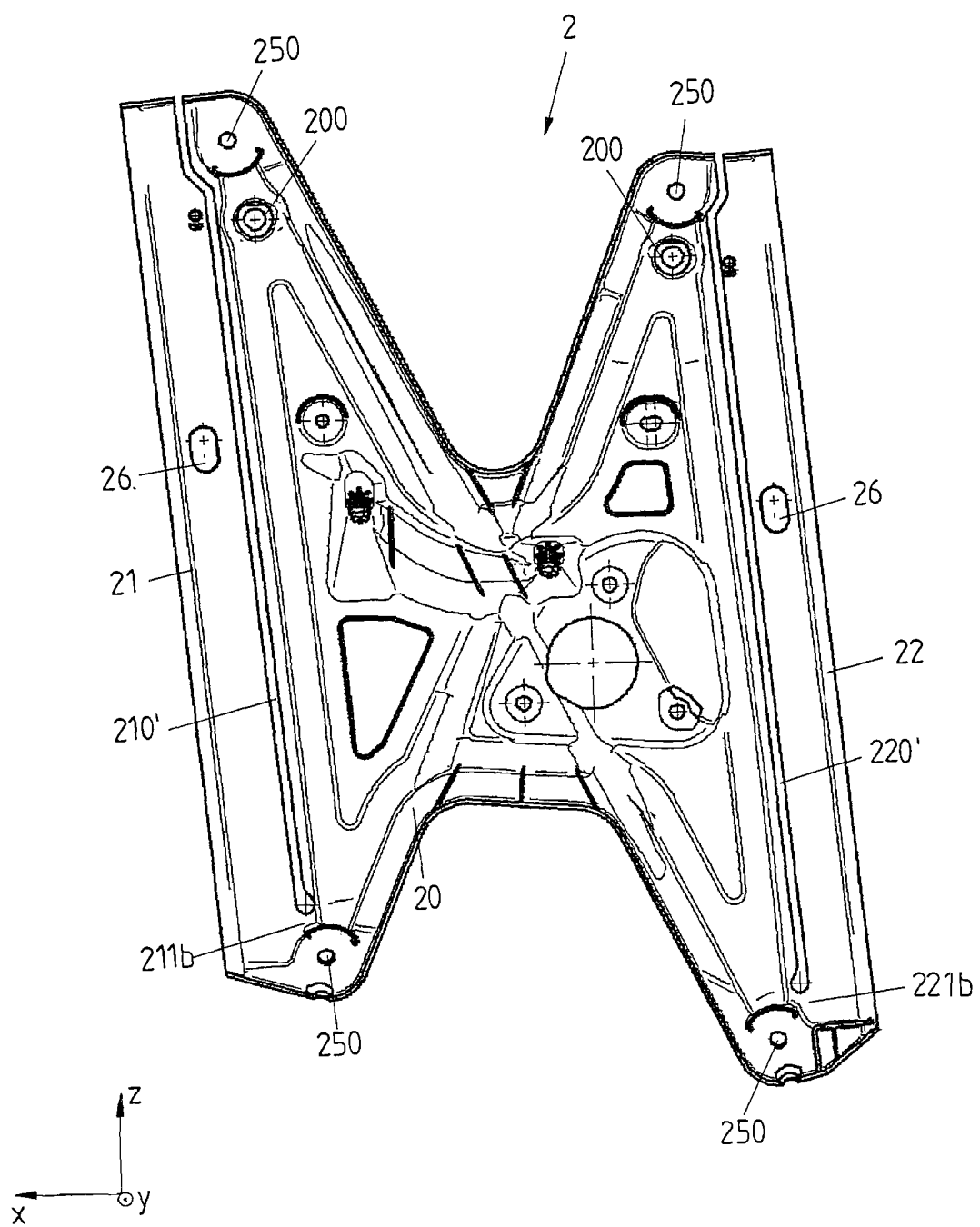
FIG. 10 shows a separate view of another variant of an aggregate carrier with sectionally cut free guide sections.

A second variant of an aggregate carrier 2 is shown schematically shown in FIG. 2 and in a specific embodiment in FIG. 10. In comparison to the variant according to FIG. 1 or FIG. 9, herein guide sections 21, 22 are provided which in each case are connected with the rigid section 20 of the aggregate carrier 2 only via a lower connecting section 211b respectively 221b. By means of one recess opening 210' respectively 220' each of the guide sections 21, 22 is cut free above the connecting sections 211b respectively 221b in the longitudinal direction of the respective guide section 21, 22, wherein the recess openings 210', 220' extend in each case in the shape of slots to the upper edge of the aggregate carrier 2.

By providing the recess openings 210', 220' and by completely cutting free the upper ends of the guide sections 21, 22 a flexibility of the guide sections 21, 22 in particular in the region of their upper ends is provided. In the region of their upper ends the guide sections 21, 22 can move by a comparatively large distance relative to the rigid section 20 of the aggregate carrier 2 such that in particular in the upper region of the guide sections 21, 22 an adaption to the movement path F of a window pane 150 can take place.

In the embodiments schematically shown in FIGS. 3 and 4 guide sections 21, 22 are placed within the flatly extending aggregate carrier 2 and are cut free each by two recess openings 210a, 210b respectively 220a, 220b on two sides of the guide sections 21, 22.

The guide section 21 shown in FIG. 3 on the left of the aggregate carrier 2 is cut free from the rigid section 20, which surrounds the guide section 21, by recess openings 210a, 210b and connected to the rigid section 20 by connecting sections 211aa, 211ab, 211ba, 211bb on the top respectively the bottom of the guide section 21. The guide section 22, on the other hand, shown in FIG. 3 on the right of the aggregate carrier 2 is cut free from the rigid section 20, which surrounds the guide section 22, by recess openings 220a, 220b and connected to the rigid section by connecting sections 221aa, 221ab, 221ba, 221bb on the top respectively the bottom of the guide section 21.

The guide section 21 according to the embodiment of FIG. 4, in contrast, is cut free from the rigid section 20 by recess openings 210'a, 210'b extending towards the upper edge of the aggregate carrier 2. The guide section 22 is connected to the rigid section 20 only via connecting sections 211ba, 211bb at the bottom of the guide section 21. The guide section 22 according to the embodiment of FIG. 4, in the same manner, is cut free from the rigid section 20 by recess openings 220'a, 220'b extending towards the upper edge of the aggregate carrier 2. The guide section 22 is connected to the rigid section 20 only via connecting sections 221ba, 221bb at the bottom of the guide section 22.

Figure 11A:
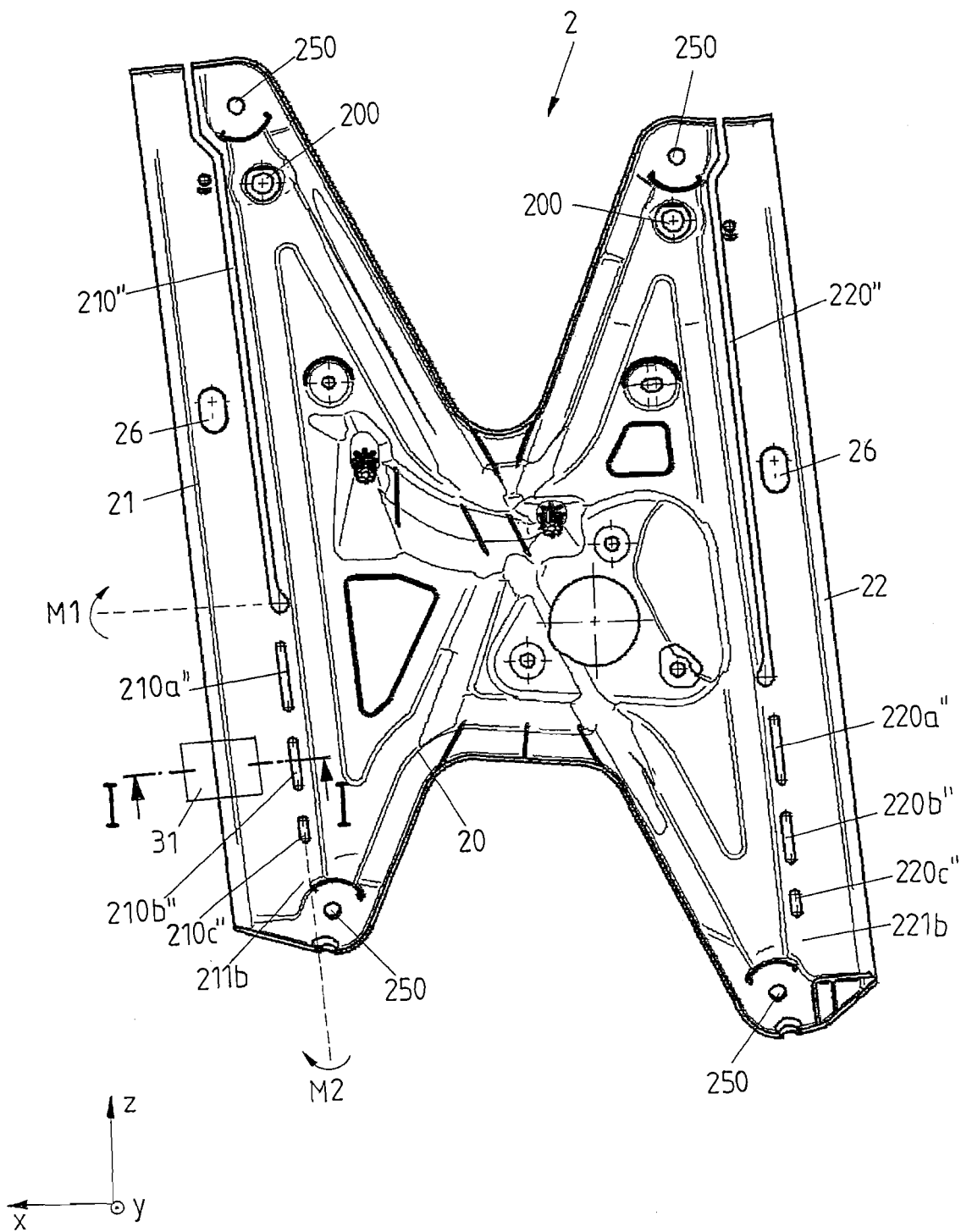
FIG. 11A shows a separate view of another variant of an aggregate carrier with sectionally cut free guide sections.
Figure 11B:
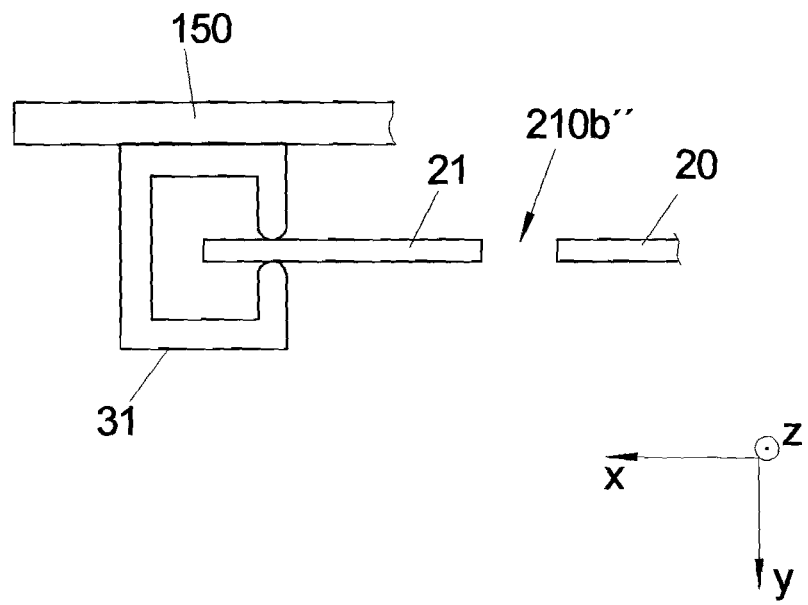
FIG. 11B, 11C show sectional views along line I-I according to FIG. 11A.
Figure 11C:
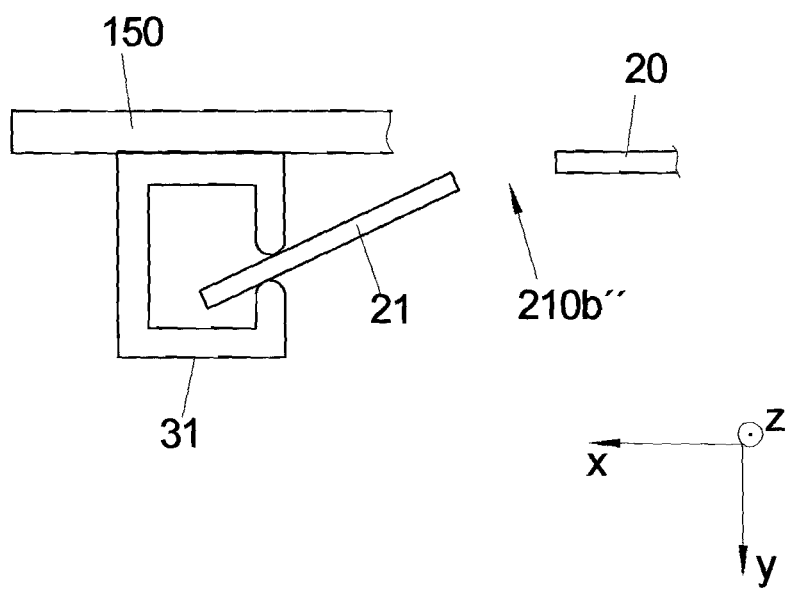

In another variant shown in FIG. 11A to 11C of an aggregate carrier 2 again recess openings 110", 220" are provided which cut free the upper ends of the guide sections 21, 22. Between the upper recess openings 210", 220" and the lower connecting sections 211b, 221b, however—in comparison to the embodiment according to FIG. 10—in each case multiple further recess openings 210a"-210c", 220a"-220c" are provided which are formed in the shape of slots, comprise different lengths and cut free the guide sections 21, 22 sectionally in their lower region from the rigid section 20 of the aggregate carrier 2.

By providing the multiple recess openings 210a"-210c", 220a"-220c" the moment of inertia of the connection of the guide sections 21, 22 with the rigid section 20 in each case is varied in the lower regions of the guide sections 21, 22 and is adapted such that in the lower regions of the guide sections 21, 22 a flexibility of the guide sections 21, 22 results which varies in the longitudinal direction of the guide sections 21, 22. In the upper region of the guide sections 21, 22, namely in the region of the cut free upper ends of the guide sections 21, 22, the guide sections 21, 22 are predominantly flexible about along the bending direction M1, wherein in the region of the lower recess openings 210a"-210c", 220a"-220c" a flexibility predominantly along the bending direction M2 results. In each case, however, the guide sections 21, 22 can adapt through their flexibility to the movement path F of a window pane 150, wherein the flexibility of the guide sections 21, 22 in their lower region is smaller, but can be adjusted in a desired manner by specifically adapting the recess openings 210a"-210c", 220a"-220c".

As is illustrated in FIGS. 11B and 11C, a carrier 31 reaches around the guide section 21, wherein, as shown in FIG. 11C, the guide section 21 can be bent relative to the rigid section 20 for adaption to the movement path F of a window pane 150. Thereby the movement path F of the carrier 31 is displaced in the Y-direction, wherein the carrier 31 maintains its angular position corresponding to the angular position of the window pane 150.

Another variant of an aggregate carrier 2 is shown in FIGS. 12A and 12B. The variant according to FIGS. 12A and 12B comprises guide sections 21, 22 which are cut free on their upper ends via recess openings 210''', 220''', wherein the recess openings 210''', 220''' do not extend to the upper edge of the aggregate carrier 2, but each pass into a recess opening 210a''', 220a''' at the upper end of the guide sections 21, 22 which is angled away and cuts free the upper end of the guide sections 21, 22 in each case completely from the rigid section 20 of the aggregate carrier 2.

In the variant according to FIGS. 12A and 12B the guide section 21 comprises, as shown in FIG. 12B, a radius of curvature R which corresponds substantially to the radius of curvature R of the (entire) aggregate carrier 2.

In a modified variant according to FIGS. 13A and 13B the guide section 21 comprises, in comparison to the variant according to FIGS. 12A and 12B, a smaller radius of curvature RA which differs from the radius of curvature R of the rigid section 20 of the aggregate carrier 2. A correspondingly smaller radius of curvature RA can also be provided for the opposite guide section 22, wherein it also is conceivable to form the guide section 22 with a different, smaller or larger radius of curvature.

Figure 14B:
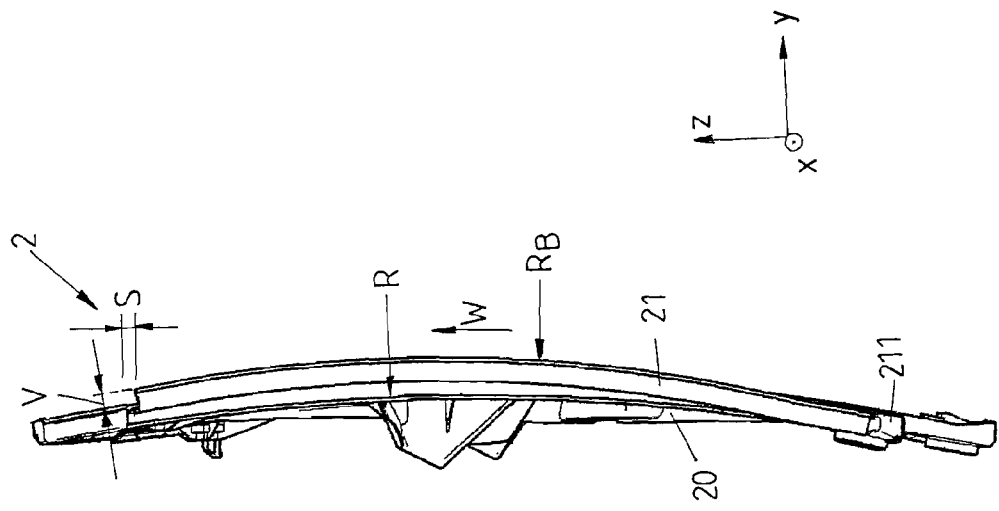
FIG. 14A, 14B show views of a modified embodiment of the variant according to FIG. 12A, 12B with a guide section having a smaller radius of curvature and an offset relative to a rigid section of the aggregate carrier.
Figure 14A:
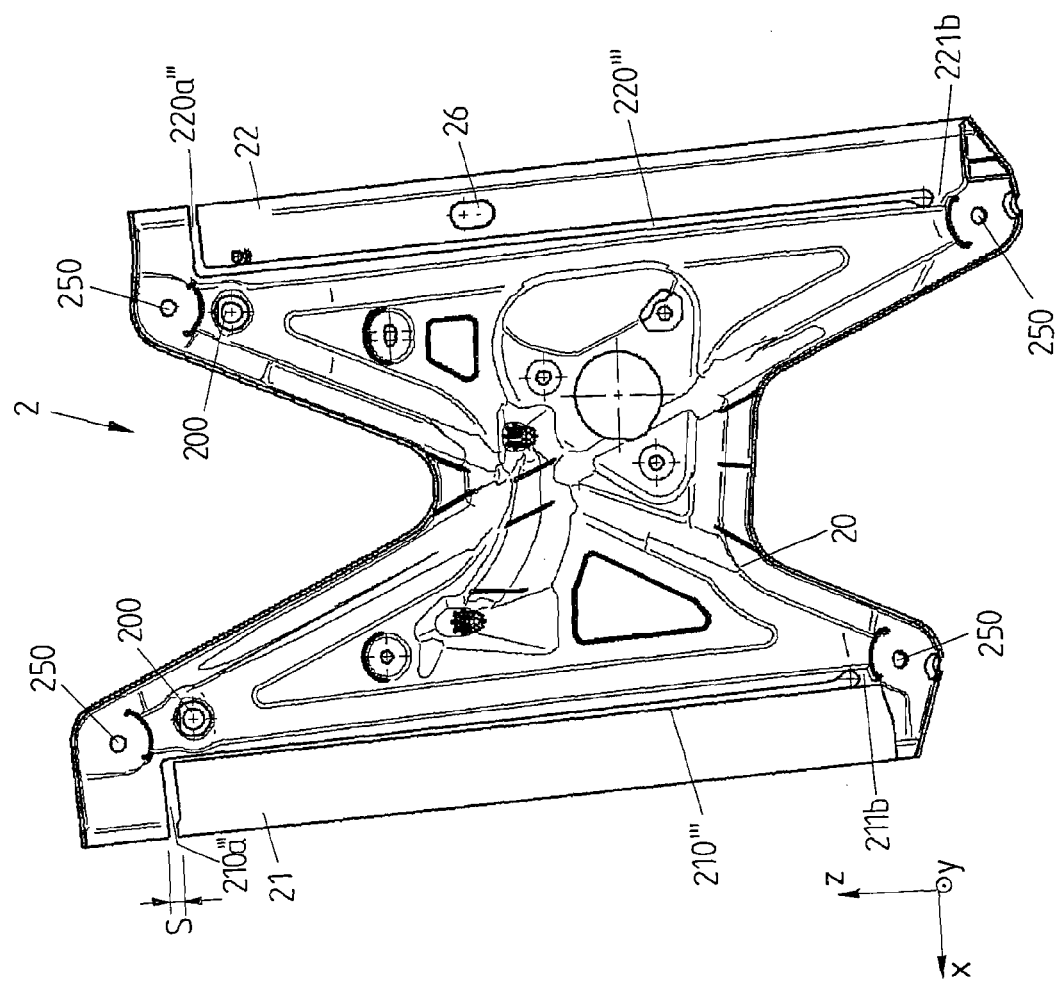

A once again modified embodiment of the variant according to FIGS. 12A and 12B is shown in FIGS. 14A and 14B in which the guide section 21 comprises a radius of curvature RB which may be smaller, equal or even larger than the radius of curvature R of the rigid section 20 of the aggregate carrier 2. In addition, an offset V between the upper end of the guide section 21 and the rigid section 20 in the region of the recess opening 210a''' is provided.

Comparative views of the embodiments according to FIGS. 12 to 14 are shown in FIG. 15A to 15C. While in the embodiment according to FIGS. 12A and 12B the rigid section 20 and the guide section 21 comprise the same radius of curvature R (see FIG. 15A), in the embodiment according to FIGS. 13A and 13B the radius of curvature RA of the guide section 21 is—by introducing a distance S between the upper end of the guide section 21 and the rigid section 20—made smaller by compressing the guide section 21 (see FIG. 15B). In the embodiment according to FIG. 14A and FIG. 14B an offset V at the upper end of the guide section 21 with respect to the rigid section 20 is introduced, wherein the radius of curvature RB of the guide section 21 may be smaller, equal or larger than the radius of curvature R of the rigid section 20.

The guide sections 21, 22 of the aggregate carrier 2 of the embodiments according to FIGS. 12 to 14 can be produced and delivered in a pre-shaped manner with specific radii of curvature R, RA, RB. In addition or alternatively it is possible, as is shown in FIG. 16A, 16B and FIG. 17A to 17C, to adapt the radius of curvature R, RA, RB (by defining a distance S) and the offset V of the guide sections 21, 22 by using adapter pieces 4, 4', 4''.

Figure 16A:
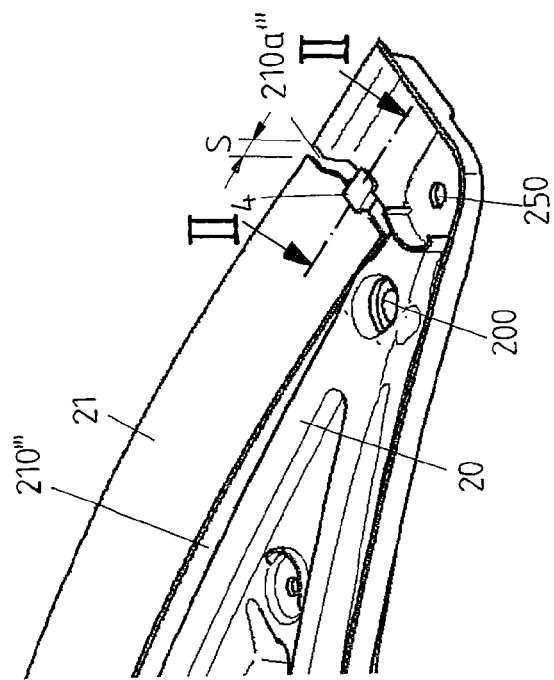
FIG. 16A, 16B show views of an adapter piece arranged on a guide section for adapting the radius of curvature.
Figure 16B:
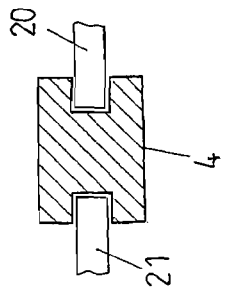

In the embodiment according to FIGS. 16A and 16B, an adapter piece 4 is inserted into the recess opening 210a''' at the upper end of the guide section 21 and thereby the guide section 21 is compressed relative to the rigid section 20 of the aggregate carrier 2. Thereby, the radius of curvature R, RA, RB of the guide section 21 is made smaller and can be adapted in a desired manner.

Figure 17A:
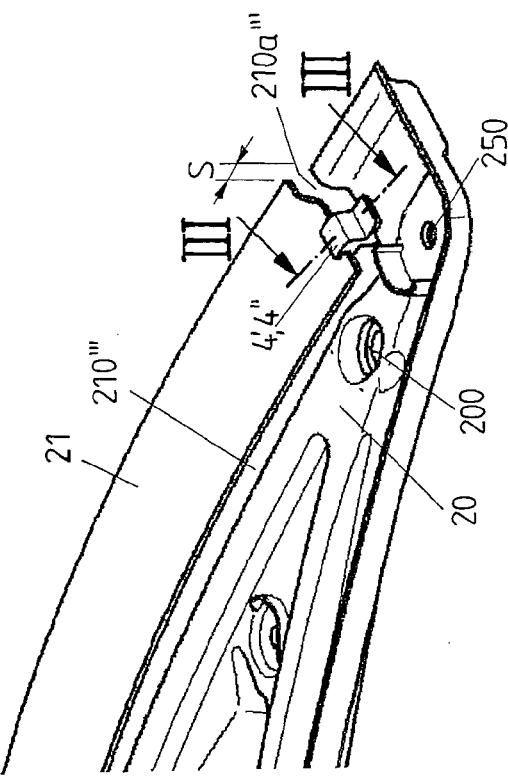
FIG. 17A-17C show views of a modified adapter piece on a guide section for adapting the radius of curvature and an offset between the guide section and a rigid section of the aggregate carrier.
Figure 17B:
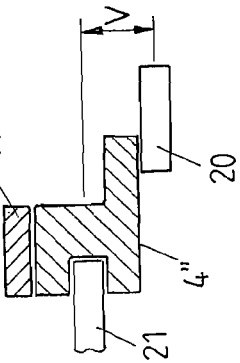
Figure 17C:
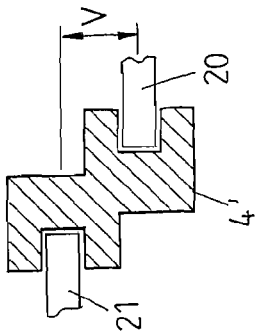

In the example according to FIGS. 17A, 17B and 17C an adapter piece 4', 4'' is used which in addition defines an offset V between the guide section 21 and the rigid section 20 of the aggregate carrier 2. In the embodiment according to FIG. 17B the adapter piece 4' reaches around edges of the guide section 21 and the rigid section 20 and is in a sticking manner inserted into the recess opening 210a'''. In the embodiment according to FIG. 17C the adapter piece 4'' in contrast abuts on the rigid section 20. On the adapter piece 4'' in addition a rattling protection element 41 for example in the shape of a rubber or foam element can be provided which prevents the guide section 21 from rattling.

Instead of using adapter pieces 4, 4', 4'' the radius of curvature R, RA, RB can be adapted also through fixing the aggregate carrier 2 and the guide sections 21, 22 on a door inner panel 12. This is schematically shown in FIGS. 18 and 19.

Figure 18:
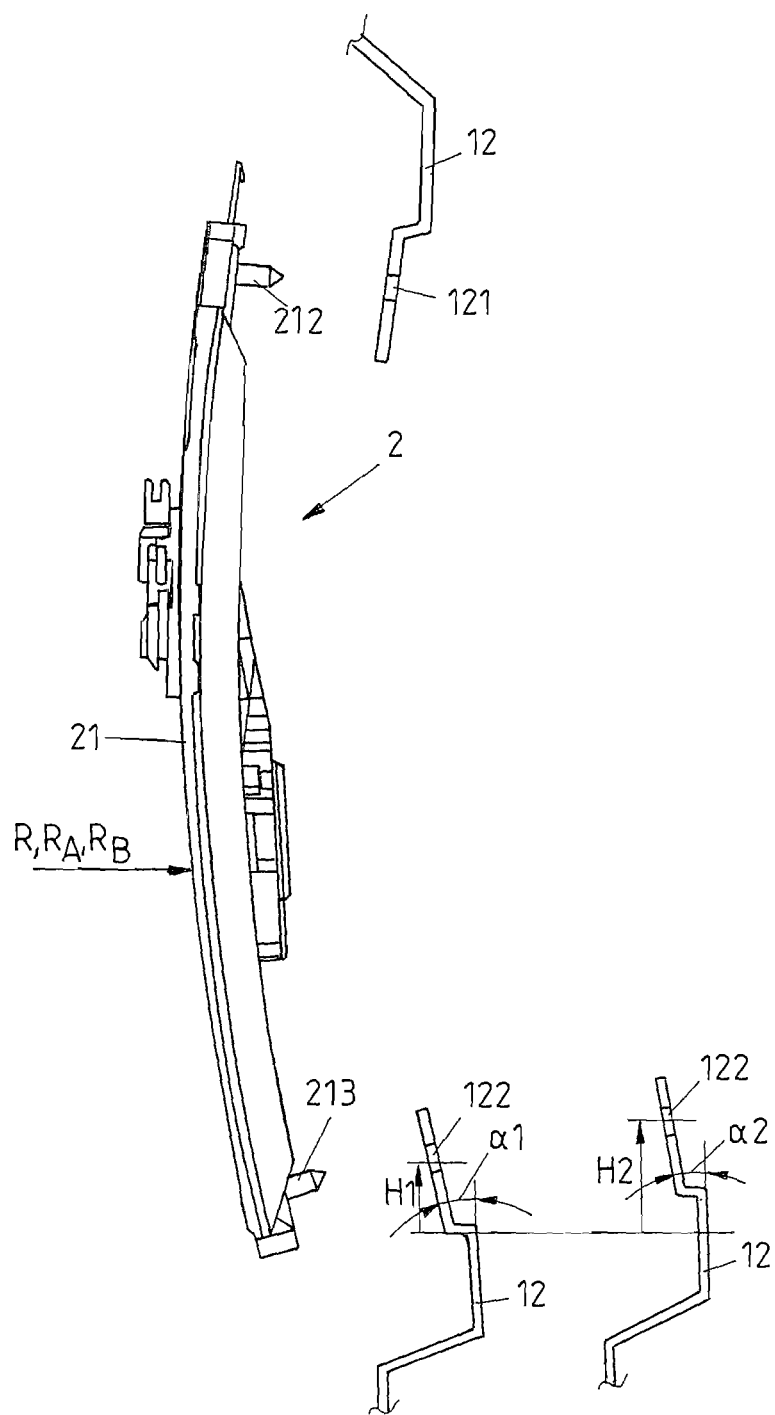
FIG. 18 shows a schematic view of an aggregate carrier to be arranged on a door inner panel.

As FIG. 18 shows, the guide section 21 is fixed to the door inner panel 12 at fixing points 121, 122 by means of fixing bolts 212, 213. By choosing the height H1, H2 of the fixing points 121, 122 and by orienting the sections of the door inner panel 12 carrying the fixing points 121, 122 with respect to the angles α1, α2 the radius of curvature R, RA, RB of the guide section 21 can be defined.

Figure 19:
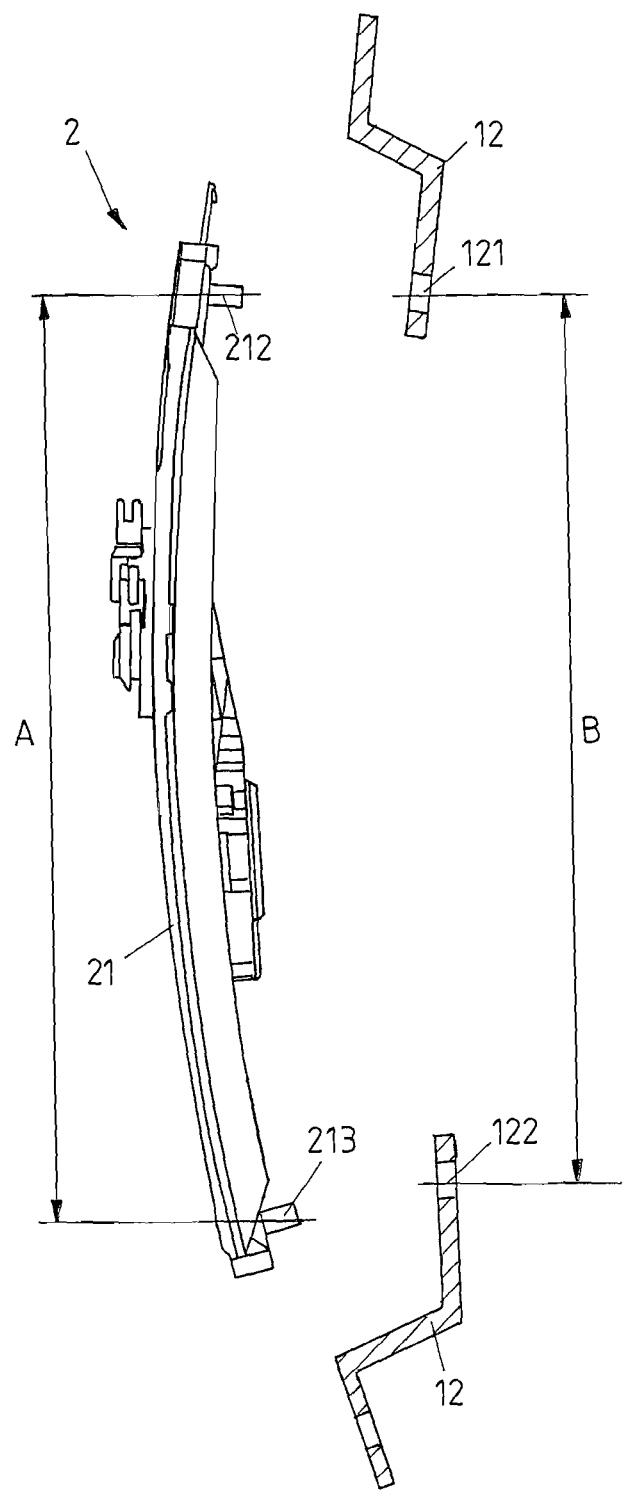
FIG. 19 shows a schematic view of an aggregate carrier to be arranged on an inner panel whose guide section is bent during fixing on the door inner panel.

Herein, the distance B between the fixing points 121, 122, as illustrated in FIG. 19, determines whether the guide section 21, when fixing it on the door inner panel 12, is compressed and the radius of curvature R. RA, RB hence is reduced. If the distance B of the fixing points 121, 122 is smaller than the distance A of the fixing bolts 212, 213 on the guide section 21, the guide section 21 is compressed when introducing the fixing bolts 212, 213 into the fixing points 121, 122 being formed as openings, such that a radius of curvature R, RA, RB of the guide section 21 results which is correspondingly reduced and can be adapted, by setting the distance B of the fixing points 121, 122 in a desired manner, to the radius of curvature R1, R2 of a window pane 150.

As is illustrated in FIGS. 20A and 20B, alternatively or in addition a tensioning means 27, for example in the shape of a cable, can be arranged on a guide section 21 for setting a radius of curvature R, RA, RB, the tensioning means 27 being fixed in a tensioning manner between the ends of the guide section 21 and defining, in its tensioned state, the radius of curvature R, RA, RB of the guide section 21. FIG. 20A herein shows the tensioning means 27 in its tensioned state, wherein FIG. 20B shows the tensioning means 27 in a released state.

Figure 21:
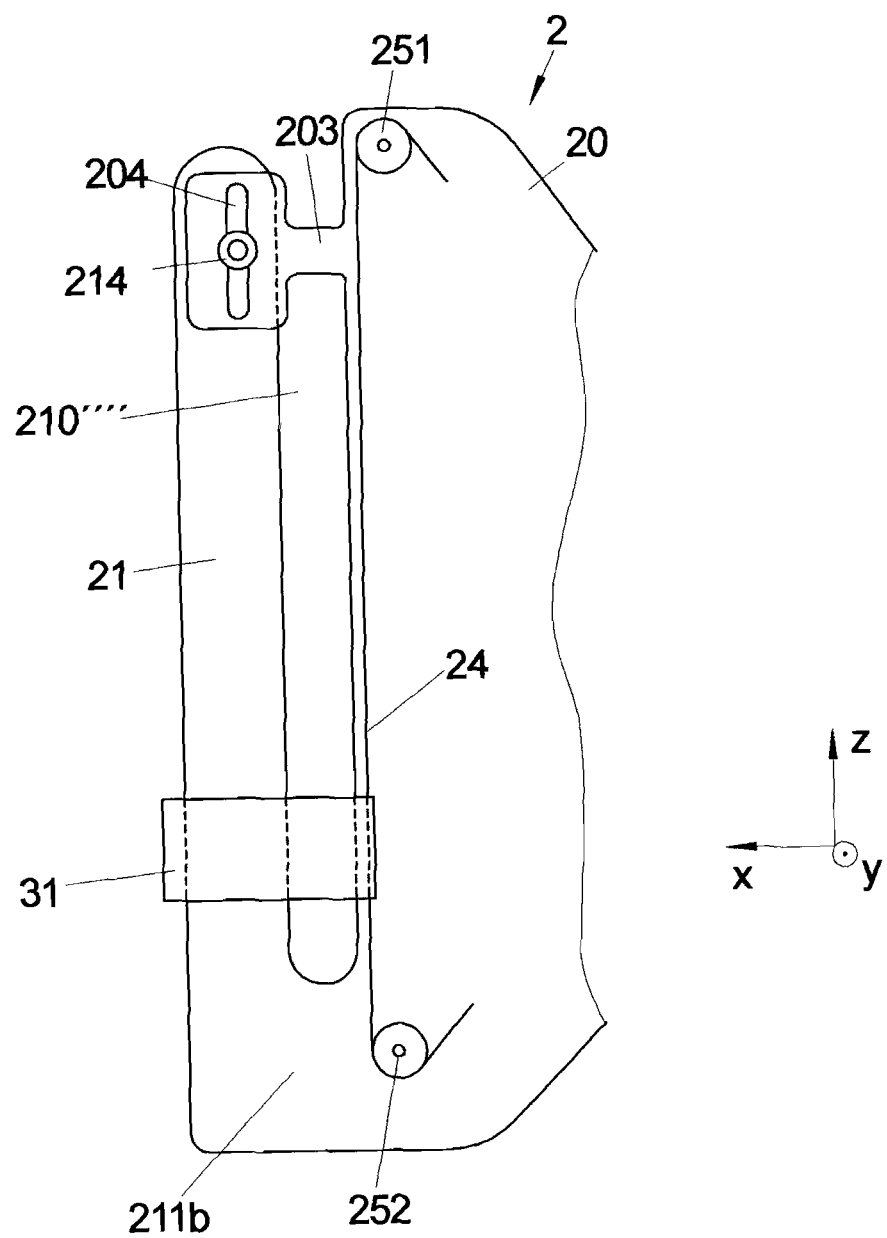
FIG. 21 shows a view of an aggregate carrier in which a guide section is arranged via one end by means of an arm movably on a rigid section of the aggregate carrier.

In the embodiment according to FIG. 21 a guide section 21 is cut free via a recess opening 210'''' from a rigid section 20 of an aggregate carrier 2 and, herein, is connected via a lower connecting section 211b and an upper arm 203 with the rigid section 20. On the upper end of the guide section 21 a connecting bolt 214 is arranged, which reaches through a long hole 204 on the arm 203 such that the upper end of the guide section 21 is fixed in the Y-direction relative to the rigid section 20, but can move longitudinally in the Z-direction relative to the arm 203 and in this way can compensate for a movement of the guide section 21.

In an embodiment illustrated in FIG. 22A to 22C a guide section 21 comprises two partial sections 21a, 21b which each are connected via a connecting section 211a, 211b with a rigid section 20 of an aggregate carrier 2. The partial sections 21a, 21b are cut free from the rigid section 20 via a recess opening 210'''' and are not connected with each other on their ends pointing towards each other such that the guide section 21 is not closed at its center. To allow for a sliding guidance of a carrier 31 along the guide section 21 a profile part 5 in the shape of an extruded plastic profile is provided which is plugged onto an outer edge of the partial sections 21a, 21b of the guide section 21. The profile part 5 comprises, at its center, a connecting section 51 which connects the partial sections 21a, 21b of the guide section 21 in a sticking manner with each other.

The profile part 5 can be arranged on the partial sections 21a, 21b of the guide section 21 in a movable manner such that a movement U of the partial sections 21a, 21b along the Y-direction (see FIG. 22B) can be compensated for by displacing the partial sections 21a, 21b in the Z-direction relative to the profile part 5.

The idea underlying the invention is not limited to the embodiments described above. Rather, also completely different embodiments are conceivable which make use of the inventive idea. For example a flexibility between a guide section and a rigid section of an aggregate carrier can be provided also by using other means, for example using recess openings of a different type or different shape. In addition it is possible to vary the length of the recess openings to cut free a guide section only in certain sections, but to connect it rigidly in other, non cut-free regions to a rigid section of an aggregate carrier.

214 Connecting bolt
23 Drive unit
230 Cable drum
231 Motoric drive
24 Traction means
250 Fixing point
251-254 Deflection
26 Assembly opening
27 Tensioning means
31, 32 Carrier
4, 4', 4" Adapter piece
41 Rattling protection element
5 Profile part
51 Connecting section
α1, α2 Angle
β1, β2 Pitch angle
A, B Distance
F Movement path
H1, H2 Height
N Wet space
M1, M2 Bending direction
R, RA, RB Radius
R1, R2 Radius of curvature
S Distance
T Dry space
V Offset
W Adjustment direction

What is claimed is:

1. A door module for a vehicle door comprising:
an aggregate carrier to hold functional components of the vehicle door, the aggregate carrier comprising a carrier section extending in a plane and at least one guide section to guide an adjustment part along an adjustment direction on the aggregate carrier,
wherein the at least one guide section adjoins the carrier section, extends in the plane away from the carrier section, and is arranged next to the carrier section in the plane,
wherein the at least one guide section extends along the adjustment direction and is bendable along the adjustment direction and, by bending the at least one guide section, is movable, relative to the carrier section of the aggregate carrier, in a direction perpendicular to the adjustment direction such that a shape of the at least one guide section is adjustable, to the adjustment part, along the adjustment direction,
wherein the at least one guide section, when viewed along the adjustment direction extends between a first distal edge and a second distal edge of the aggregate carrier;
wherein the at least one guide section comprises a curvature along the adjustment direction having a radius of curvature, the curvature being adjustable by bending the at least one guide section along the adjustment direction,
wherein the at least one guide section is partially prated from the carrier section of the aggregate carrier via at least one recess opening which is a slot at least partially extending parallel to the adjustment direction such that the at least one guide section is separated from the carrier section at least at one of the first distal edge and the second distal edge, wherein the at least one recess opening extends through at least one of the first and second distal edges.

2. The door module according to claim 1, wherein the at least one guide section is arranged on the carrier section of the aggregate carrier such that the guide section is movable in a direction substantially perpendicular to a plane of extension of the aggregate carrier relative to the carrier section of the aggregate carrier or is pivotable with respect to the carrier section.

3. The door module according to claim 1, wherein the at least one guide section is formed in one piece with the carrier section of the aggregate carrier.

4. The door module according to claim 1, wherein the at least one guide section is connected with the carrier section of the aggregate carrier via at least one connecting section.

5. The door module according to claim 1, wherein the at least one guide section extends along a longitudinal direction on the aggregate carrier and is connected via at least a lower connecting section with the carrier section of the aggregate carrier.

6. The door module according to claim 1, wherein the at least one guide section is connected on the first distal edge via a connecting section with the carrier section of the aggregate carrier and is not connected to the carrier section of the aggregate carrier at the second distal edge opposite to the first distal edge.

7. The door module according to claim 1, wherein the at least one guide section is free from the carrier section of the aggregate carrier via multiple recess openings to produce a sectionally flexible connection of the at least one guide section with the carrier section.

8. The door module according to claim 1, wherein the radius of curvature of the at least one guide section is different from a radius of curvature of the carrier section of the aggregate carrier.

9. The door module according to claim 8, wherein the aggregate carrier is shaped such that the carrier section of the aggregate carrier and the at least one guide section comprise different radii of curvature.

10. The door module according to claim 8, further comprising a door inner panel of the vehicle door, wherein the radius of curvature of the at least one guide section is set by the door inner panel of the vehicle door on which the aggregate carrier is fixed.

11. The door module according to claim 8, wherein a tensioner is provided on the at least one guide section to define the radius of curvature.

12. The door module according to claim 1, wherein the at least one guide section comprises two guide sections along each of which a carrier is guided to guide the adjustment part along the adjustment direction.

13. The door module according to claim 1, wherein the adjustment part comprises a window pane.

* * * * *